(12) United States Patent
Thompson et al.

(10) Patent No.: US 9,836,969 B2
(45) Date of Patent: Dec. 5, 2017

(54) SYSTEM AND METHOD FOR CONNECTING TRAFFIC INTERSECTIONS

(71) Applicant: Miovision Technologies Incorporated, Kitchener (CA)

(72) Inventors: David Thompson, Waterloo (CA); Tyler Abbott, Waterloo (CA); Kashif Umer, Kitchener (CA); David Hillis, Kitchener (CA); Roy Lemke, Kitchener (CA); Jason Chan, Waterloo (CA)

(73) Assignee: Miovision Technologies Incorporated, Kitchener (CA)

( * ) Notice: Subject to any disclaimer, the term of this patent is extended or adjusted under 35 U.S.C. 154(b) by 0 days.

(21) Appl. No.: 15/150,128

(22) Filed: May 9, 2016

(65) Prior Publication Data

US 2016/0351048 A1 Dec. 1, 2016

Related U.S. Application Data

(60) Provisional application No. 62/168,325, filed on May 29, 2015.

(51) Int. Cl.
| | |
|---|---|
| *G08G 1/07* | (2006.01) |
| *G08G 1/09* | (2006.01) |
| *G08G 1/095* | (2006.01) |
| *G06F 11/30* | (2006.01) |
| *G08G 1/04* | (2006.01) |

(Continued)

(52) U.S. Cl.
CPC .............. *G08G 1/07* (2013.01); *G06F 11/30* (2013.01); *G08G 1/04* (2013.01); *G08G 1/081* (2013.01); *G08G 1/09* (2013.01); *G08G 1/095* (2013.01); *H04L 41/082* (2013.01); *H04L 67/12* (2013.01)

(58) Field of Classification Search
CPC G08G 1/07; G08G 1/08; G08G 1/081; G08G 1/085; G08G 1/087; G08G 1/09; G08G 1/091; G08G 1/095; G08G 1/096
See application file for complete search history.

(56) References Cited

U.S. PATENT DOCUMENTS

2006/0028357 A1 2/2006 Beckwith et al.
2010/0325720 A1* 12/2010 Etchegoyen ........ H04L 63/1408
726/17

(Continued)

OTHER PUBLICATIONS

Nakra, S.; Search Report from corresponding PCT Application No. PCT/CA2016/050531; search completed Aug. 5, 2016.

*Primary Examiner* — Van Trieu
(74) *Attorney, Agent, or Firm* — Brett J. Slaney; Blake, Cassels & Graydon LLP

(57) ABSTRACT

A system and method are provided for connecting intersections, to enable two-way wireless communication between a cloud-based traffic operations service and new and existing traffic cabinet hardware using "connected intersection" technology. By providing hardware in existing (or new) traffic control cabinets that can communicate wirelessly with a cloud-based traffic operations system, customers can enhance and upgrade legacy traffic networks using existing IT infrastructure (i.e. servers, hard drives, etc.) or existing communication networks. The connected intersection technology further provides software functionalities including real-time alerts, connectivity between existing cabinets and central systems, and signal timing-plan management for customers that lack an existing central system.

18 Claims, 28 Drawing Sheets

(51) Int. Cl.
  *G08G 1/081* (2006.01)
  *H04L 12/24* (2006.01)
  *H04L 29/08* (2006.01)

(56) References Cited

U.S. PATENT DOCUMENTS

| | | |
|---|---|---|
| 2011/0109478 A1 | 5/2011 | Williamson et al. |
| 2012/0112928 A1* | 5/2012 | Nishimura ............... G08G 1/07 340/909 |
| 2012/0218126 A1* | 8/2012 | Roberts .................. G08G 1/087 340/906 |
| 2013/0076539 A1 | 3/2013 | Runiks et al. |

* cited by examiner

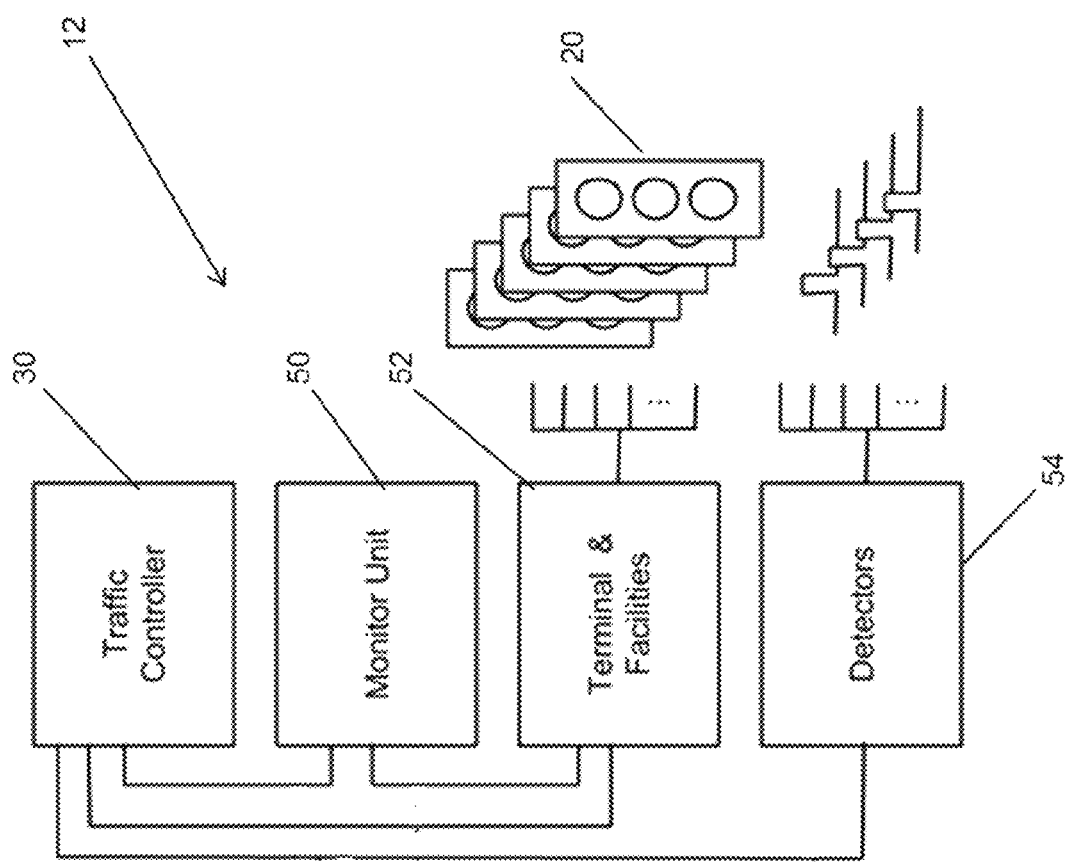

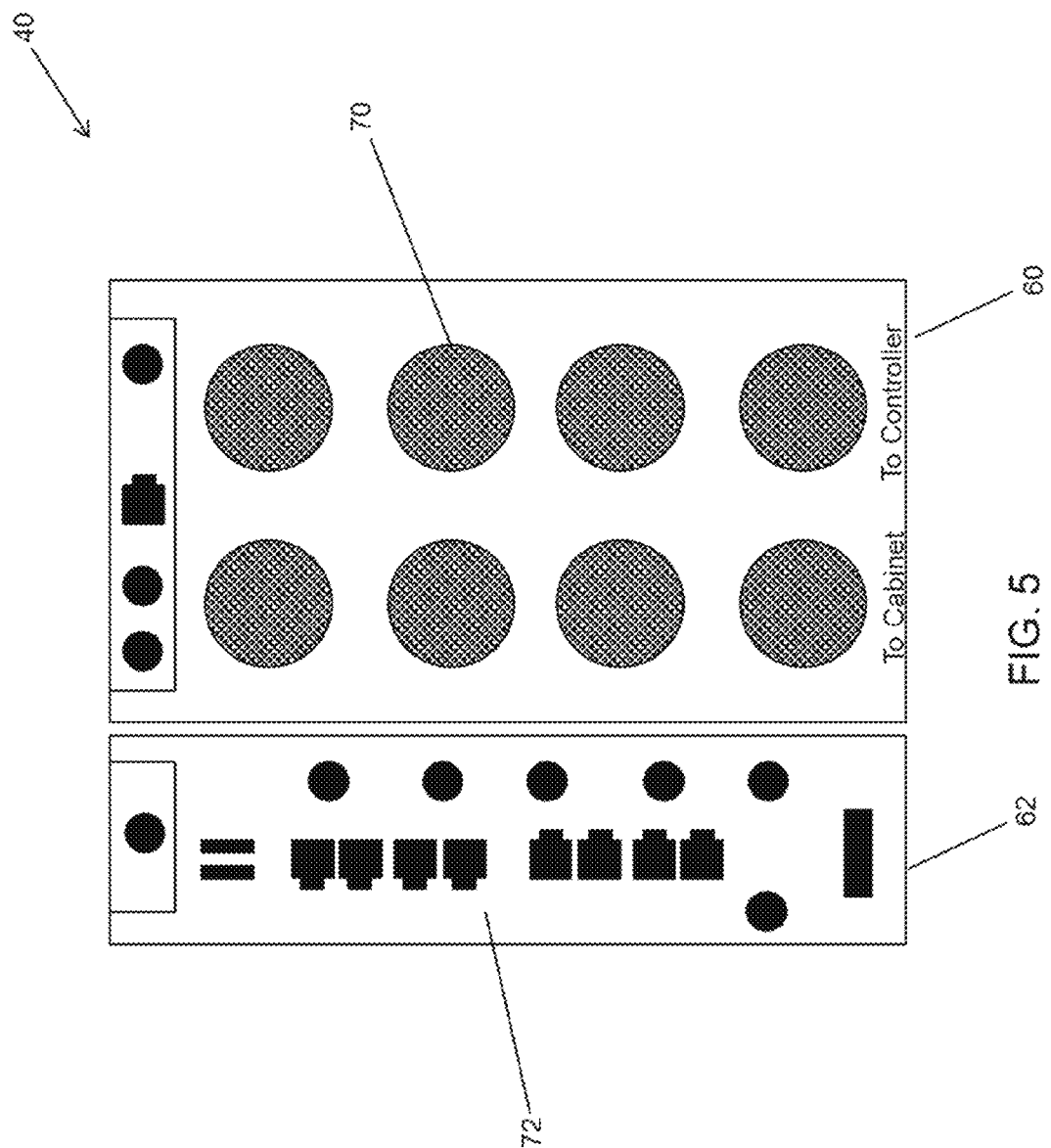

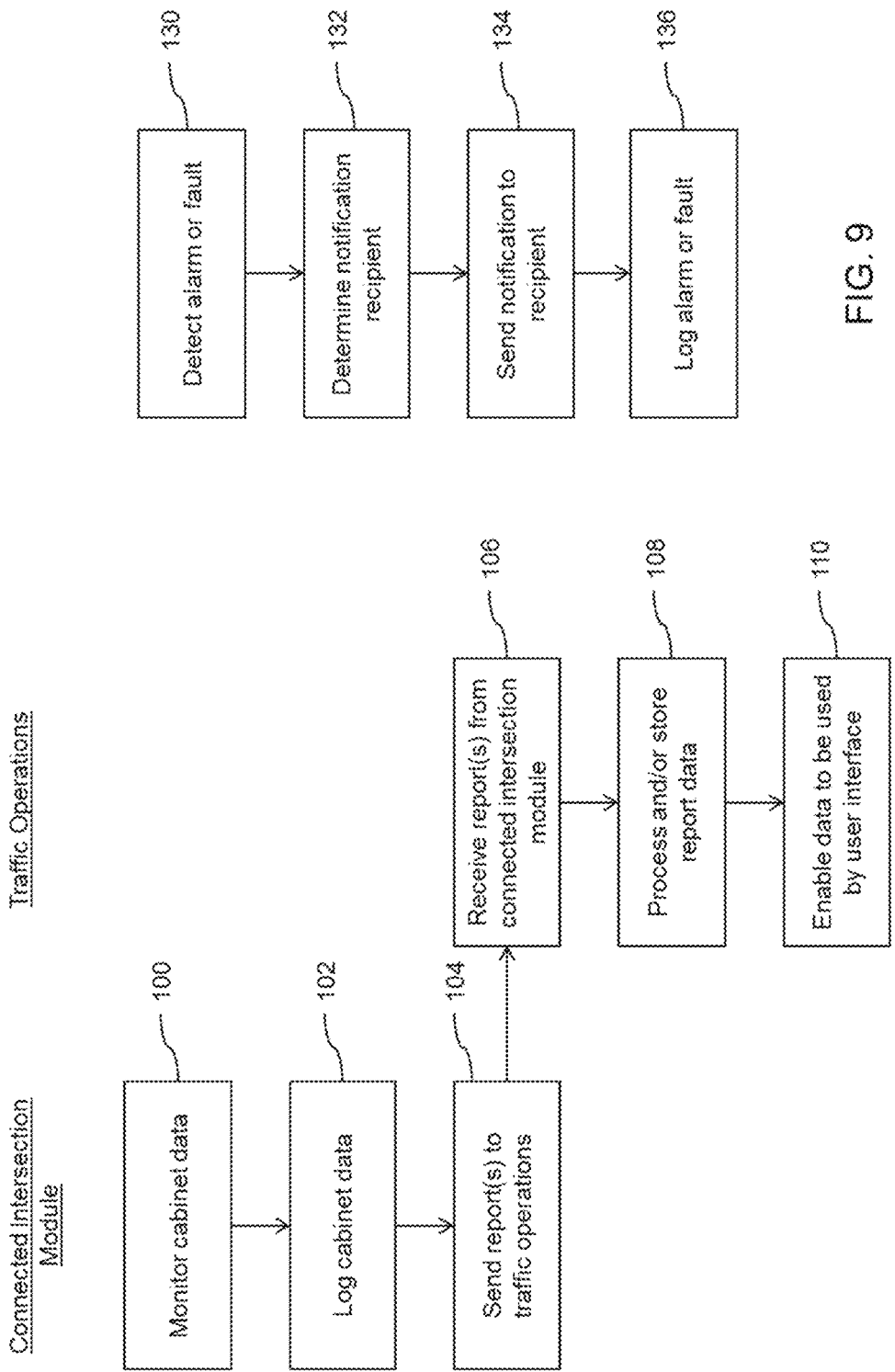

SYSTEM AND METHOD FOR CONNECTING TRAFFIC INTERSECTIONS

CROSS-REFERENCE TO RELATED APPLICATION(S)

This application claims priority to U.S. Provisional Application No. 62/168,325 filed on May 29, 2015, the contents of which are incorporated herein by reference.

TECHNICAL FIELD

The following relates to systems and methods for connecting traffic intersections.

DESCRIPTION OF THE RELATED ART

Roadway intersections that include traffic lights typically include a control cabinet which houses a traffic controller, various detectors and monitoring devices, and terminal facilities that interface with the traffic lights. The controller is used to perform various functions, including implementing a timing plan for changing traffic lights at the intersection.

A traffic control authority such as a town, city, or municipality, may wish to utilize a central monitoring system (CMS) to communicate with control cabinets within their traffic network and to monitor events happening at those intersections. However, a CMS requires connectivity between the control cabinets and the CMS. For example, some existing traffic networks utilize hardwired connectivity such as copper cabling or fiber optic cabling. These hardwired solutions are known to be expensive and time consuming to implement and maintain.

On the other hand, without connectivity, technicians and operators are required to travel to particular intersections to perform hardware or software upgrades, to provide new timing plans, and to investigate faults or alerts which could be false positives.

It has been found that many traffic networks include heterogeneous capabilities. For example, some cabinets may be of different generations and/or utilize different standards. This has led to a divergence and large variation in the controller and cabinet configurations in the field. Similarly, some traffic intersections may be connected to a CMS, while others are not. The heterogeneity of these systems can be caused by various factors, not the least of which is that the cost of upgrading these cabinets is considered high, particularly for large networks, and can put significant pressure on the budget of the relevant authority.

It is an object of the following to address at least one of the above-noted disadvantages.

SUMMARY

The following provides a system and method for connecting traffic intersections to enable two-way, wireless communication, between a cloud-based traffic operations service and new and existing traffic cabinet hardware.

In one aspect, there is provided a system for enabling wireless communication with a traffic control cabinet, the system comprising: a cabinet adaptor device comprising at least one interface with a communication bus within the cabinet for communicating with at least one of a traffic controller, a monitor unit, terminal and facilities, and detectors in the cabinet; and a communications hub coupled to the cabinet adaptor device, the communications hub comprising a wireless network interface and an application programming interface for enabling remote communications to and from the system and for interacting with the at least one of the traffic controller, the monitor unit, the terminal and facilities, and the detectors in the cabinet.

In another aspect, there is provided a method of monitoring data in a traffic control cabinet, the method comprising: monitoring and storing cabinet data using a cabinet adaptor device comprising at least one interface with a communication bus within the cabinet for communicating with at least one of a traffic controller, a monitor unit, terminal and facilities, and detectors in the cabinet; and sending a report comprising the cabinet data using a communications hub coupled to the cabinet adaptor device, the communications hub comprising a wireless network interface and an application programming interface for enabling remote communications to and from the system and for interacting with the at least one of the traffic controller, the monitor unit, the terminal and facilities, and the detectors in the cabinet.

In yet another aspect, there is provided a method of monitoring data in a traffic control cabinet, the method comprising: detecting an alarm or fault using a cabinet adaptor device comprising at least one interface with a communication bus within the cabinet for communicating with at least one of a traffic controller, a monitor unit, terminal and facilities, and detectors in the cabinet; determining a notification recipient; and sending a notification to the recipient indicative of the alarm or fault using a communications hub coupled to the cabinet adaptor device, the communications hub comprising a wireless network interface and an application programming interface for enabling remote communications to and from the system and for interacting with the at least one of the traffic controller, the monitor unit, the terminal and facilities, and the detectors in the cabinet.

In yet another aspect, there is provided a method for updating firmware in a traffic control cabinet, the method comprising: determining an update to be applied at an intersection; and sending the update to a communications hub in a traffic cabinet at the intersection, the communications hub comprising a wireless network interface and an application programming interface for enabling remote communications to and from the system and for interacting with at least one of a traffic controller, a monitor unit, a terminal and facilities, and detectors in the cabinet.

In yet another aspect, there is provided a method of selecting a series of pre-existing timing plans to be applied across a traffic network, the method comprising: analyzing network data to determine a state of the traffic network; providing visualizations for an administrator of the traffic network to assess a traffic state; providing the administrator with an enumerated list of available timing plans for at least one traffic intersection; and upon selection of the at least one timing plans, sending the at least one timing plan to the at least one traffic intersection by communicating with a communications hub in a traffic cabinet at the intersection, the communications hub comprising a wireless network interface and an application programming interface for enabling remote communications to and from the system and for interacting with at least one of a traffic controller, a monitor unit, a terminal and facilities, and detectors in the cabinet.

In yet another aspect, there is provided a method for updating timing plans in a traffic network, the method comprising: monitoring data in the traffic network; analyzing the data to determine a state of the traffic network; determining at least one timing plan or change to an existing timing plan, for at least one traffic intersection in the traffic network, according to the state of the traffic network; and sending the at least one timing plan or timing plan change to the at least one traffic intersection by communicating with a communications hub in a traffic cabinet at the intersection, the communications hub comprising a wireless network interface and an application programming interface for enabling remote communications to and from the system and for interacting with at least one of a traffic controller, a monitor unit, a terminal and facilities, and detectors in the cabinet.

BRIEF DESCRIPTION OF THE DRAWINGS

Embodiments will now be described by way of example only with reference to the appended drawings wherein:

FIG. 3 is a block diagram of components in an existing traffic control cabinet;

FIG. 5 is a representative external view of the connected intersection module illustrating connection ports;

FIG. 8 is a flow chart illustrating example computer executable instructions for monitoring data at a traffic cabinet and reporting the data to a traffic operations center;

FIG. 9 is a flow chart illustrating example computer executable instructions for generating a notification in response to a detected alarm or fault;

DETAILED DESCRIPTION

The following provides a system and method for connecting intersections, to enable two-way wireless communication between a cloud-based traffic operations service and new and existing traffic cabinet hardware using the following "connected intersection" technology. By providing hardware in existing (or new) traffic control cabinets that can communicate wirelessly with a cloud-based traffic operations system, customers can enhance and upgrade legacy traffic networks using their existing IT infrastructure (i.e. servers, hard drives, etc.) or existing communication networks, i.e. without requiring installation of new IT infrastructure. The connected intersection technology herein described further provides software functionalities including real-time alerts, connectivity between existing cabinets and central systems, and signal timing-plan management for customers that lack an existing central management system. The framework provided by the connected intersection technology also allows for any remote software upgrade or reporting/data logging to be performed, via a common user interface. In this way, even if the traffic network includes a heterogeneous mix of different cabinets using different specifications according to various legacies, the connected intersection technology is configured to translate interfaces, communication protocols, messaging, and other specifications on the hardware side, to a consistent user interface on the traffic operations side.

Figure 1:
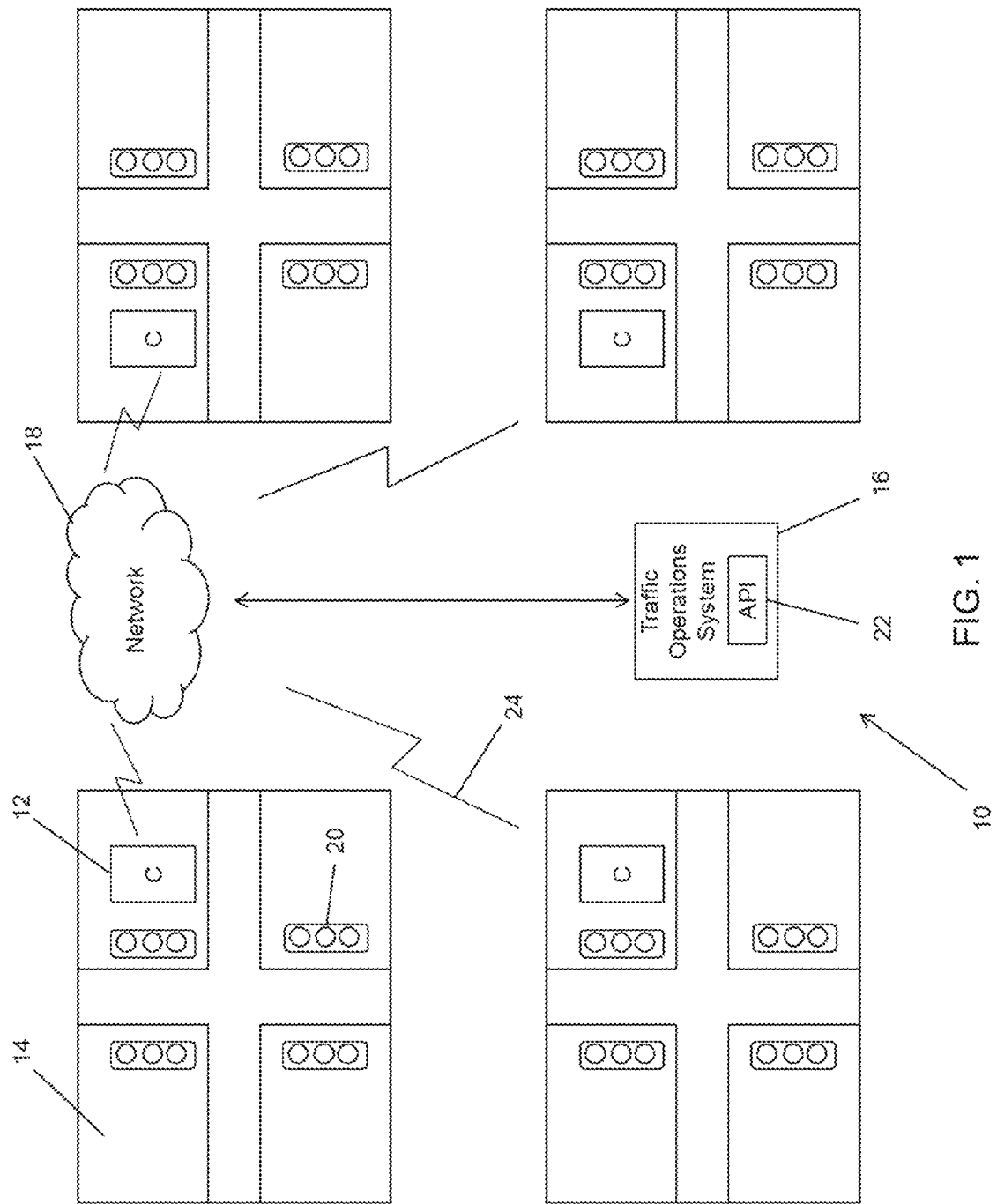
FIG. 1 is a schematic diagram of a connected intersections system.

Turning now to the figures, FIG. 1 illustrates an example of a traffic network 10. The traffic network 10 includes a traffic control cabinet 12 at each of a number of traffic intersections 14. Each traffic intersection 14 includes one or more traffic lights 20 for controlling traffic at the intersection 14. The traffic network 10 in this example is at least in part monitored and/or controlled by a traffic operations system 16. The traffic operations system 16 communicates with the cabinets 12 at the intersections 14 via a wireless network 18 such as a cellular communications network 24, e.g., via a 4G LTE connection.

The traffic operations system 16 also includes an application programming interface (API) 22 for communicating with the cabinets 12 in a uniform and consistent manner, regardless of the type of hardware being used at any given cabinet 12. As discussed in greater detail below, the API 22 can be deployed across the traffic network 10 in the various cabinets 12 to enable the aforementioned connected intersection technology to be applied across the network, whether the network includes a homogeneous set of installations, or a heterogeneous configuration of cabinets 12.

Figure 2A:
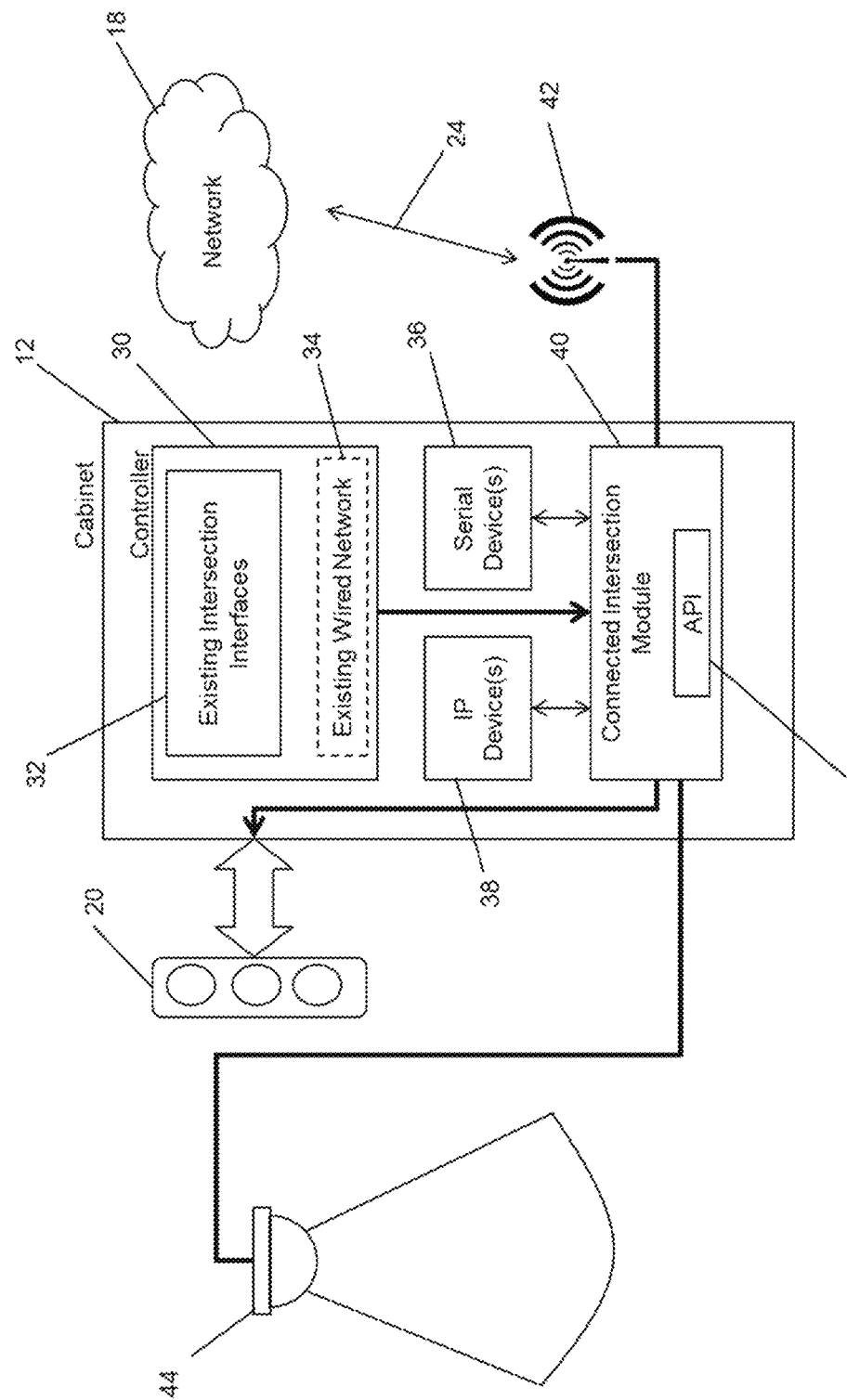
FIG. 2(a) is a block diagram of a traffic control cabinet that has been retrofitted for wireless connectivity using a connected intersection module.

FIG. 2(*a*) illustrates a schematic example configuration for a cabinet 12 that has been retrofitted to include a connected intersection module 40. It can be appreciated that the term "module" is used herein generically to represent any one or more hardware and/or software components that collectively provide the connected intersection functionality as herein described. Example configurations are provided below. The cabinet 12 includes a traffic controller 30 that is normally deployed with a cabinet 12 to control traffic lights 20 and to interface with other components within the cabinet 12 such as detectors 54, monitoring units 50, and terminal and facilities 52, shown in greater detail in FIG. 3 described below. The controller 30 in this example includes one or more existing intersection interfaces 32, e.g., data communication buses for communicating with other components in the cabinet 12, shown generally in FIG. 2(*a*) for ease of illustration. The controller 30 may also have existing wired network capabilities 34, e.g., copper or fiber optic cabling.

The connected intersection module 40 in this example is configured to intercept data from the controller 30 and interface with the traffic lights 20. However, it can be appreciated that the connected intersection module 40 can also be retrofitted in parallel to monitor traffic on data buses rather than intercept the data. The connected intersection module 40 can also interface with IP devices 38 and/or serial devices 36 in the cabinet 12 to provide "serial-to-cellular" (i.e. wireless) connectivity. This allows $3^{rd}$ party software to be bridged across the internet, in order to communicate with devices in the cabinet 12 that utilize serial protocols (serial devices 36) or IP protocols that would otherwise be inaccessible remotely (e.g., various ones of IP devices 38). In this way, these devices appear as if they were local to a machine running the $3^{rd}$ party software. Examples of such $3^{rd}$ party software includes, without limitation, monitor unit diagnostics and detector configuration and diagnostics. Also shown in FIG. 2(*a*) are a camera 44 and antenna 42 coupled to the connected intersection module 40. The wireless communication capabilities enables images and video captured by the camera 44 to be sent to the traffic operations system 16 via the network 18. The antenna 42 enables the connected intersection module 40 to communicate via the network 18. As can be appreciated from FIG. 2(*a*), an existing cabinet 12 can be upgraded to provide two-way wireless connectivity and provide video recording and/or imaging functionality by installing the connected intersection module 40, antenna 42 and camera 44. The API 22 enables any known specification being used on the cabinet side of the connected intersection module 40 to be understandable and useable with other devices on the communication layer side of the connected intersection module 40.

The connected intersection module 40 therefore provides significant enhancements to existing traffic network hardware by:

Integrating with legacy infrastructure to enable normally unattainable features/benefits such as connectivity;

Connecting the various devices in the cabinet, e.g., both serial and IP devices thus allowing, e.g., $3^{rd}$ party software to be bridged across the internet;

Pushing maintenance and/or power failure alerts directly to traffic operations personnel, making it easier to do management and maintenance at an intersection 14;

Coordinating and linking signals and provide active management of timing plans without the need for an "Advanced Traffic Management System" (ATMS), which can save significant cost; and Linking to detectors and video streams, providing video storage and recall capabilities, and providing valuable data to 3rd parties such as a police authority.

By enabling the connected intersection module 40 to be integrated into existing traffic control cabinets 12, there are also various features that can be used to enhance those older legacy cabinets 12 over and above what can be provided by simply upgrading with a new controller 30. For example, such functionality may include without limitation:

The use of a uniform API 22 enables large heterogeneous networks of controllers 30 to interoperate;

By being reachable via the internet, using the connected intersection module's communication infrastructure, the network traffic data may be readily accessible by any machine connected to the internet or included in aggregate views;

The connected intersection module 40 is automatically remotely accessible without the need for public agencies to purchase any server infrastructure;

Remote programming and telemetry of any serial or Ethernet enabled devices in the cabinet 12 is possible; and Network connectivity speeds enables high bitrate applications such as video streaming, peripheral device data streaming, etc.

The connected intersection module 40 also provides additional functionality to cabinet controllers 30 that are not currently available. Such functionality may include, without limitation:

Internet connectivity by default, wherein all controllers 30 are connected to the internet using the built in cellular communication infrastructure, and no server infrastructure is required by public agencies to enable this connectivity.

Backward compatible open uniform API 22 enables all controllers 30 to communicate using an open uniform standard regardless of the type of cabinet 12 in which they are installed. Individual cabinet constraints are communicated as part of this protocol. This level of abstraction enables applications to be developed across heterogeneous traffic networks 10.

Large scale network level coordination or traffic modelling is enabled through the combination of the internet connectivity and open uniform API 22.

Network connectivity speeds enables high bitrate applications such as video streaming and peripheral device data streaming.

In addition to being used to retrofit legacy cabinet hardware, the connected intersection module 40 can also be used, as illustrated in FIG. 2(*b*), to provide controller and other functionality for newly installed cabinets 12 and to enable new features into older cabinets 12. This enables cost savings by eliminating the need to additionally purchase and install the controller 30 in order to perform the various operations at the intersection 14. In these configurations, the connected intersection module 40 assumes the functionality and responsibility of the controller 30, as will be explained in greater detail below. In yet another scenario, controller and other functionality can be provided to legacy cabinets 12 having a controller 30 but such functionality can remain "dormant" until an upgrade to the controller 30 is needed. At that time, the functionality can be remotely activated to have the connected intersection module 40 act as the controller 30 going forward.

The connected intersection module 40 and its API 22 can be configured to communicate according to various standards and specifications, such as the following North American standards for traffic control cabinets 12 and controllers 30, by way of example without limitation:

NEMA TS1 Specification>*NEMA TS* 1-1989 (R1994, R2000, R2005). (2004) Rosslyn, Va.: National Electrical Manufactures Association.

NEMA TS2 Specification>*NEMA TS* 2-2003 (R2008). (2012). Rosslyn, Va.: National Electrical Manufactures Association.

170 Specification>*The California/New York type* 170 *traffic signal controller system: Hardware specification*. (1978). Washington: [U.S. Federal Highway Administration.

2070 Specification>*Transportation electrical equipment specifications: TEES*. (2009). Sacramento, Calif.: California Dept. of Transportation.

ATC Controller Specification>*Adopted ATC Controller Standard Revision* 5.2*b*. (2006). Washington, D.C.: American Association of State Highway and Transportation Officials, Institute of Transportation Engineers, National Electrical Manufacturers Association.

ITS Cabinet Specification>*Intelligent Transportation System (ITS) Standard Specification for Roadside Cabinets*. (2006). Washington, D.C.: American Association of State Highway and Transportation Officials, Institute of Transportation Engineers, National Electrical Manufacturers Association.

As is known in the art, the oldest standards are the TS1 and 170 specifications, with successors to the TS1 specification being TS2, and successors to the 170 specification being 2070, ATC and ITS.

Given these various specifications and thus different legacy hardware that may already be deployed, the following scenarios are possible for utilizing a connected intersection module 40:

Scenario #1: Existing signalized intersection with a TS1 cabinet 12 and TS1 controller 30 and no connectivity.

Scenario #2: Existing signalized intersection with a TS1 cabinet 12 and TS1 controller 30 and copper wire connectivity.

Scenario #3: Existing signalized intersection with a TS1 cabinet 12 and TS2-Type 2 controller 30 and no connectivity.

Scenario #4: Existing signalized intersection with a TS1 cabinet 12 and TS2-Type 2 controller 30 and copper wire connectivity.

Scenario #5: Existing signalized intersection with a TS1 cabinet 12 and TS2-Type 2 controller 30 and network connectivity.

Scenario #6: Existing signalized intersection with a TS2-Type 2 cabinet 12 and TS1 controller 30 and no connectivity.

Scenario #7: Existing signalized intersection with a TS2-Type 2 cabinet 12 and TS1 controller 30 and copper wire connectivity.

Scenario #8: Existing signalized intersection with a TS2-Type 2 cabinet 12 and TS2-Type 2 controller 30 and no connectivity.

Scenario #9: Existing signalized intersection with a TS2-Type 2 cabinet 12 and TS2-Type 2 controller 30 and copper wire connectivity.

Scenario #10: Existing signalized intersection with a TS2-Type 2 cabinet 12 and TS2-Type 2 controller 30 and network connectivity.

Scenario #11: Existing signalized intersection with a TS2-Type 1 cabinet 12 and TS2-Type 1 controller 30 and no connectivity.

Scenario #12: Existing signalized intersection with a TS2-Type 1 cabinet 12 and TS2-Type 1 controller 30 and copper wire connectivity.

Scenario #13: Existing signalized intersection with a TS2-Type 1 cabinet 12 and TS2-Type 1 controller 30 and network connectivity.

Scenario #14: Existing signalized intersection with a 170 cabinet 12 and 170 controller 30 and no connectivity.

Scenario #15: Existing signalized intersection with a 170 cabinet 12 and 170 controller 30 and copper wire connectivity.

Scenario #16: Existing signalized intersection with a 170 cabinet 12 and 170 controller 30 and network connectivity.

Scenario #17: Existing signalized intersection with a 2070 cabinet 12 and 170 controller 30 and no connectivity.

Scenario #18: Existing signalized intersection with a 2070 cabinet 12 and 170 controller 30 and copper wire connectivity.

Scenario #19: Existing signalized intersection with a 2070 cabinet 12 and 170 controller 30 and network connectivity.

Scenario #20: Existing signalized intersection with a 2070 cabinet 12 and 170E controller 30 and no connectivity.

Scenario #21: Existing signalized intersection with a 2070 cabinet 12 and 170E controller 30 and copper wire connectivity.

Scenario #22: Existing signalized intersection with a 2070 cabinet 12 and 170E controller 30 and network connectivity.

Scenario #23: Existing signalized intersection with a ITS cabinet 12 and 170E controller 30 and no connectivity.

Scenario #24: Existing signalized intersection with a ITS cabinet 12 and 170E controller 30 and copper wire connectivity.

Scenario #25: Existing signalized intersection with a ITS cabinet 12 and 170E controller 30 and network connectivity.

Scenario #26: Existing signalized intersection with a ITS cabinet 12 and ATC controller 30 and no connectivity.

Scenario #27: Existing signalized intersection with a ITS cabinet 12 and ATC controller 30 and copper wire connectivity.

Scenario #28: Existing signalized intersection with a ITS cabinet 12 and ATC controller 30 and network connectivity.

Scenario #29: New intersection with an TS1 cabinet 12.

Scenario #30: New intersection with an TS2-Type 1 cabinet 12.

Scenario #31: New intersection with an TS2-Type 2 cabinet 12.

Scenario #32: New intersection with an 170 cabinet 12.

Scenario #33: New intersection with an 2070 cabinet 12.

Scenario #34: New intersection with an ITS cabinet 12.

Advantages of the connected intersection module 40 under scenarios 1-28 outlined above, depending on the specific configuration, could be to:

a. Provide connectivity to existing central management system software for both the existing controller and other serial peripherals. For example, this applies to scenarios 1, 3, 6, 8, 11, 14, 17, 20, 23 and 26 with no need to run cable runs to existing intersections 14 for controllers 30 supporting specific central management systems. For scenarios 2, 4, 7, 12, 15, 18, 21, 24 and 27, the increased speed may enable remote programming via the central management system where it was not viable before.

b. Augment existing controller functionality with the ability to remotely read controller status information and action plans. This applies to scenarios 1 to 28 for all controllers 30. The type of information that may be read are as follows:

Scenarios 1 to 28: intersection alarms (fault states), current signal phase(s) and next signal phase(s), signal detection; and Scenarios 3 to 5, 8 to 13 and 26 to 28 with controllers 30 that support NTCIP: phase, channel, ring, detector, preemption and coordination parameters as well as action plan.

With respect to existing domain technology, using the connected intersection controller 40: adds connectivity to scenarios 1, 3, 6, 8, 11, 14, 17, 20, 23 and 26, adds real-time data to scenarios 2, 4, 7, 12, 15, 18, 21, 24 and 27, and integrates complex heterogeneous networks of controllers 30 through the use of a uniform API 22. By being reachable via the internet, using the connected intersection module's communication infrastructure, the network traffic data may be readily accessible by any machine connected to the internet or included in aggregate views.

c. Augment existing controller functionality with the ability to modify. Scenarios 3 to 5, 8 to 13, and 26 to 28 with controllers that support NTCIP: phase, channel, ring, detector, preemption and coordination parameters as well as action plan. With respect to existing domain technology, using the connected intersection controller 40: Adds real-time connectivity to scenarios 1 to 4, 6 to 9, 11 to 12, 14 to 15, 17 to 18, 20 to 21, and 26 to 28; provides a unified API 22 to communicate and control a heterogeneous mixture of controllers 30; and enables coordination across networks 10 consisting of mixtures of controllers 30.

d. Add transit signal prioritization capabilities with no additional hardware under the following scenarios: scenarios 1 to 2, 6 to 7 and 14 to 25: using existing "call-to-service" facilities, and scenarios 3 to 5, 8 to 13 and 26 to 28 with controllers that support NTCIP: using existing preemption facilities. With respect to existing domain technology, using the connected intersection controller 40 enables transit prioritization to infrastructure not designed to accommodate transit prioritization.

e. Can replace existing controller functionality. For example, add remote modification and read of phase, channel, ring, detector, preemption and coordination parameters as well as action plan for all scenarios 1 to 28. With respect to existing domain technology, using the connected intersection controller 40: coordination of signal control across large heterogeneous cabinet configurations can be provided with no need to upgrade existing controllers or cabinets.

Figure 2B:
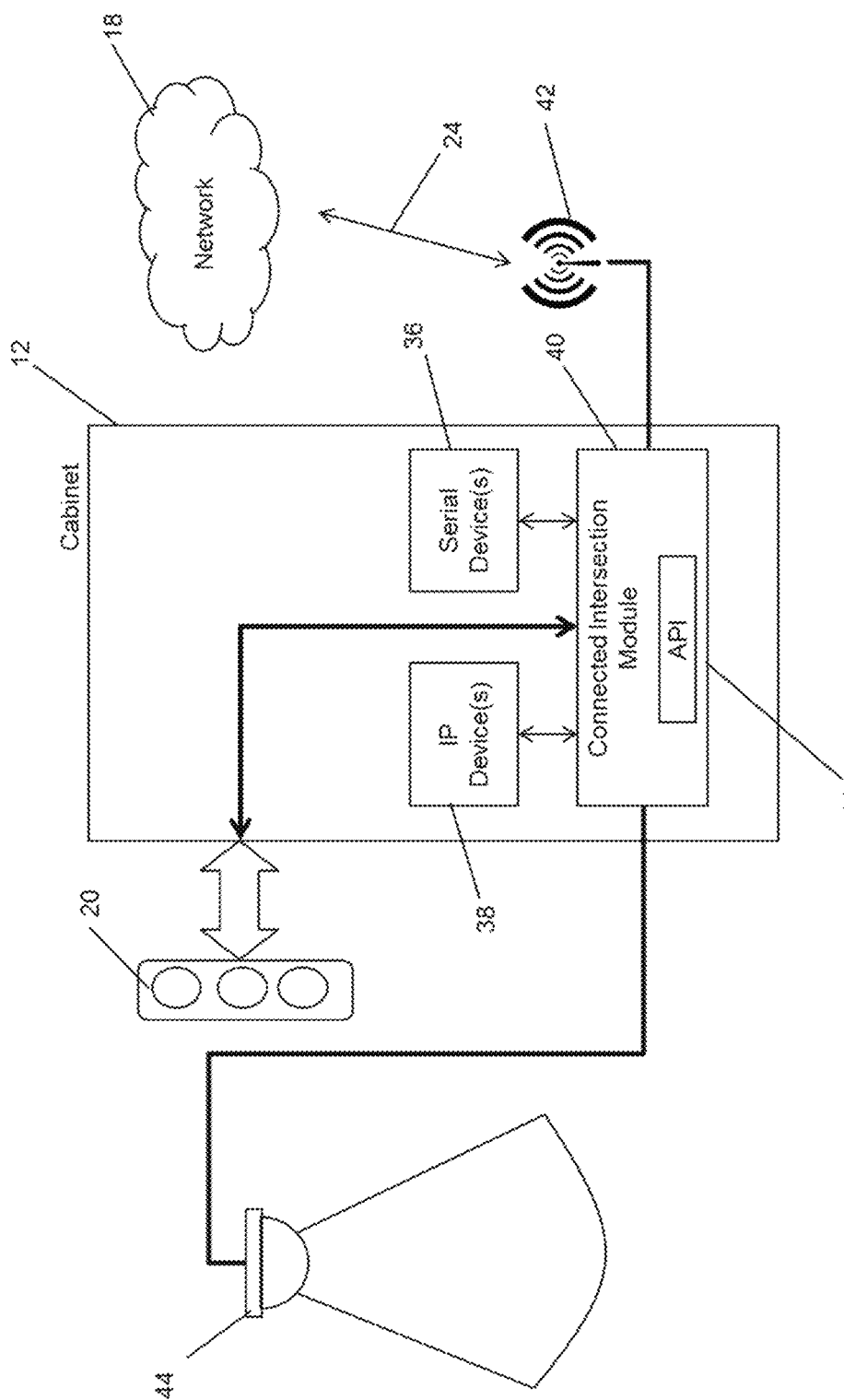
FIG. 2(b) is a block diagram of a traffic control cabinet built with a connected intersection module providing wireless connectivity and controller functionality.

Currently to achieve remote communication and coordination across a simple network of 5-20 intersections an agency would have to upgrade all of their cabinets and controllers to a proprietary brand, add fiber between networks and install server infrastructure along with the proprietary ATMS software. In addition, they would need to hire support staff to maintain all of the infrastructure added. The connected intersection module 40 enables the same functionality on the existing infrastructure without the need to lay fiber or procure or maintain server infrastructure and is not proprietary. The uniform API 22 and internet connectivity allows unparalleled aggregate views of traffic data and enable sharing The advantages of using the connected intersection module 40 in scenarios 29 to 34 would be to act in place as a traffic controller. For example:

See e. above—"replace existing controller functionality"—for a description, as well as FIG. 2(b). In this case no controller 30 needs be installed. Internet connectivity and accessibility is the default with no need to install fiber.

All features of the cabinets 12 are supported and remotely programmable.

Network coordination is automatically available and manageable via a standard uniform API 22 across all connected intersection module-enabled intersections.

Network connectivity speeds enables high bitrate applications such as video streaming, peripheral device data streaming.

Turning now to FIG. 3, a schematic diagram of an existing cabinet 12 is shown. The cabinet 12 generally includes a controller 30; a monitor unit 50 for interfacing with monitoring devices and may also be referred to as an MMU, CMU/CMV, MU; terminal and facilities 52 for operating the traffic lights 20 at the intersection 14; and detectors 54 for detecting events and other signals or inputs such as the presence of vehicles in the intersections (e.g., via a loop). As shown in FIG. 3, the controller 30 typically communicates with the monitor unit 50, terminal and facilities 52, and detectors 54 to coordinate operation of the cabinet 12 and traffic lights 20. The monitor unit 50 also communicates with the terminal and facilities 52 to engage a flashing operation at the lights 20 when detecting a fault.

Figure 4A:
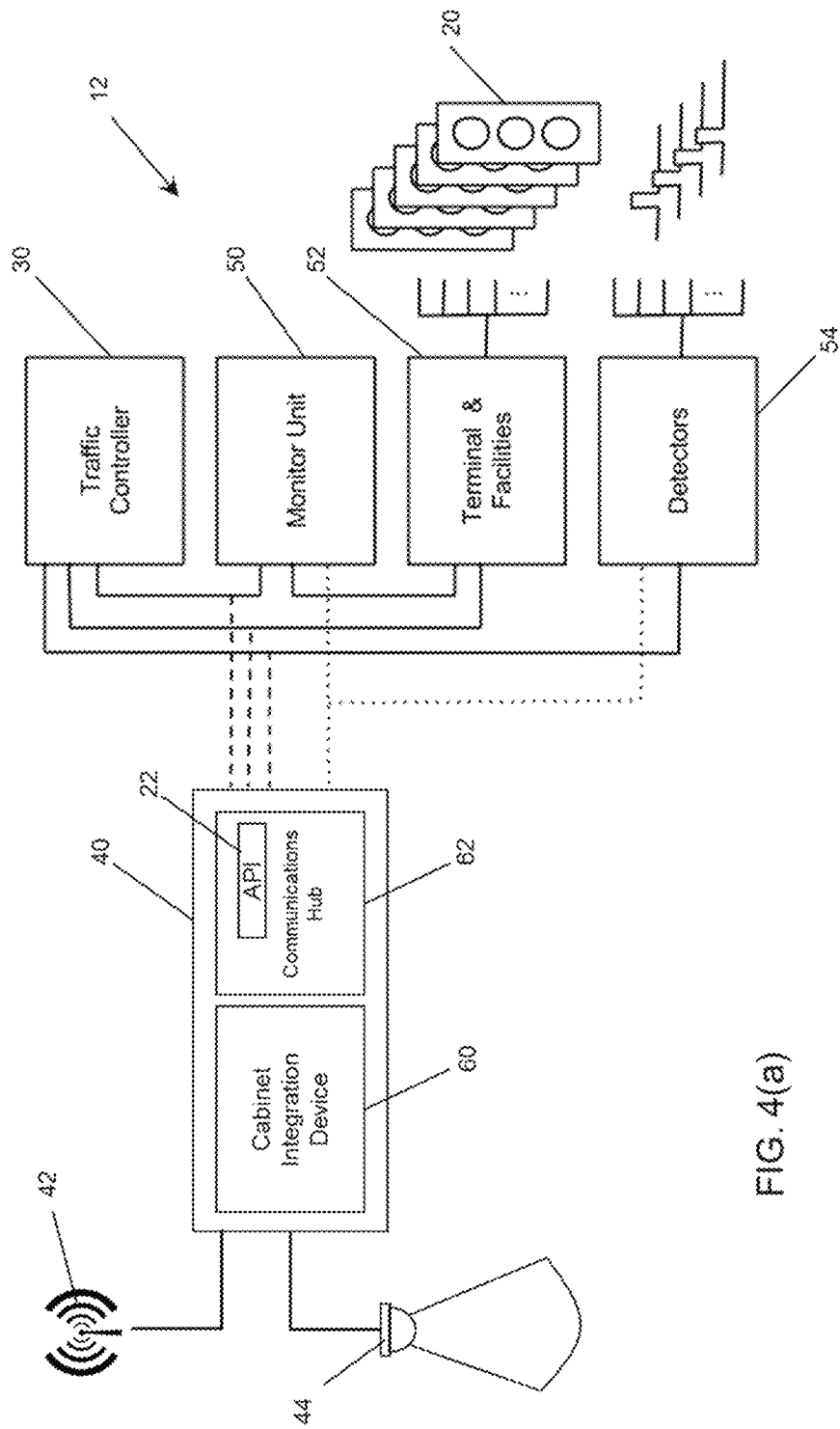
FIG. 4(a) is a block diagram of components in a traffic control cabinet retrofitted for wireless connectivity using a connected intersection module.

FIG. 4(a) illustrates adaptation of the connected intersection module 40 with an existing cabinet 12 in one example. The connected intersection module 40 interfaces with existing data buses responsible for connecting the existing components in the cabinet 12, as illustrated with dashed lines.

FIG. 4(a) also illustrates further detail of one example configuration for the connected intersection module 40. In this example configuration, the connected intersection module 40 includes a cabinet adaptor device 60 and a communications hub 62. The communications hub 62 includes or otherwise is compatible with the uniform API 22.

The cabinet adaptor device 60 sits between the traffic cabinet's analog signals and the communications hub 62. The cabinet interface device 60 can be configured as a generic interface device capable of connecting with the major known types of traffic cabinets 12, including those listed above. The cabinet interface device 60 can include a number of capabilities, including: an external Ethernet port to connect to the communications hub 62, the requisite input pins for reading cabinet telemetry, the requisite output pins to emulate controller functionality, temperature rated housing and components, universal I/O cables for interfacing with a variety of cabinet types.

The communications hub 62 is a primary communication device interfacing with both cloud-based software (e.g. at the traffic operations system 16), and the other in-cabinet devices. The communications hub 62 can be installed within existing traffic cabinets without requiring on-site configuration. For example, initial setup and configuration can be handled remotely by the cloud software. Moreover, all subsequent configuration changes can be similarly performed remotely. Upon initial power-up and antenna installation, a visual indicator such as an LED can be used to indicate when the communications hub 62 has successfully connected with the traffic operations system 16, thus further simplifying the retrofitting operation at existing cabinets 12.

The communications hub 62 also has various capabilities, including without limitation: wireless communications capabilities (e.g., 4G LTE), GPS capability, power backup to enable notification of local cabinet power outages, Ethernet ports to support peripheral devices, serial ports to support legacy traffic controllers 30 and peripheral devices, USB ports to support peripheral devices, ports for supporting diversity signals, temperature rated housing and components, wireless upgrades, WiFi capability for mesh networking with other connected intersection modules 40 at other intersections 14, and onboard storage and expansion slots for future product capabilities.

Installing the two in-cabinet devices (60, 62) and the antenna 42 and camera 44 can be done typically without requiring large machinery such as a bucket truck, electrical certification, or cable pulls through conduit. The installation is relatively simple, for example, the two devices (60, 62) can be placed securely onto the cabinet shelf (not shown), installing the wireless communications antenna 42, powering the cabinet adaptor device 60 from the cabinet 12, connecting the various cables to interface with the components in the cabinet 12 shown in FIG. 3. After physical installation, subsequent steps such as mapping the hardware to a GPS location, mapping signal and detector channels to the user interface, and establishing alert notifications can be completed remotely, e.g. from the traffic operations system 16. It may be noted that due to the cloud-based system herein described, communications networks and in-office IT infrastructure does not need to be installed as is the case with existing systems. Similarly, whether one-to-one closed loop connectivity to an existing central management system already exists, or a master-slave configuration is currently used, the connectivity can be simplified by retrofitting a network 10 with the connected intersection modules 40 at the intersection cabinets 12. This can avoid the need for having the same brand of equipment in order for intersections to communicate (e.g. in a master-slave arrangement), as well as other proprietary equipment required in closed loop systems. Even with heterogeneous networks, the same level of connectivity and functionality can be provided to remove complexity and simplifying upgrades, remote timing plan deployment, etc.

Figure 4B:
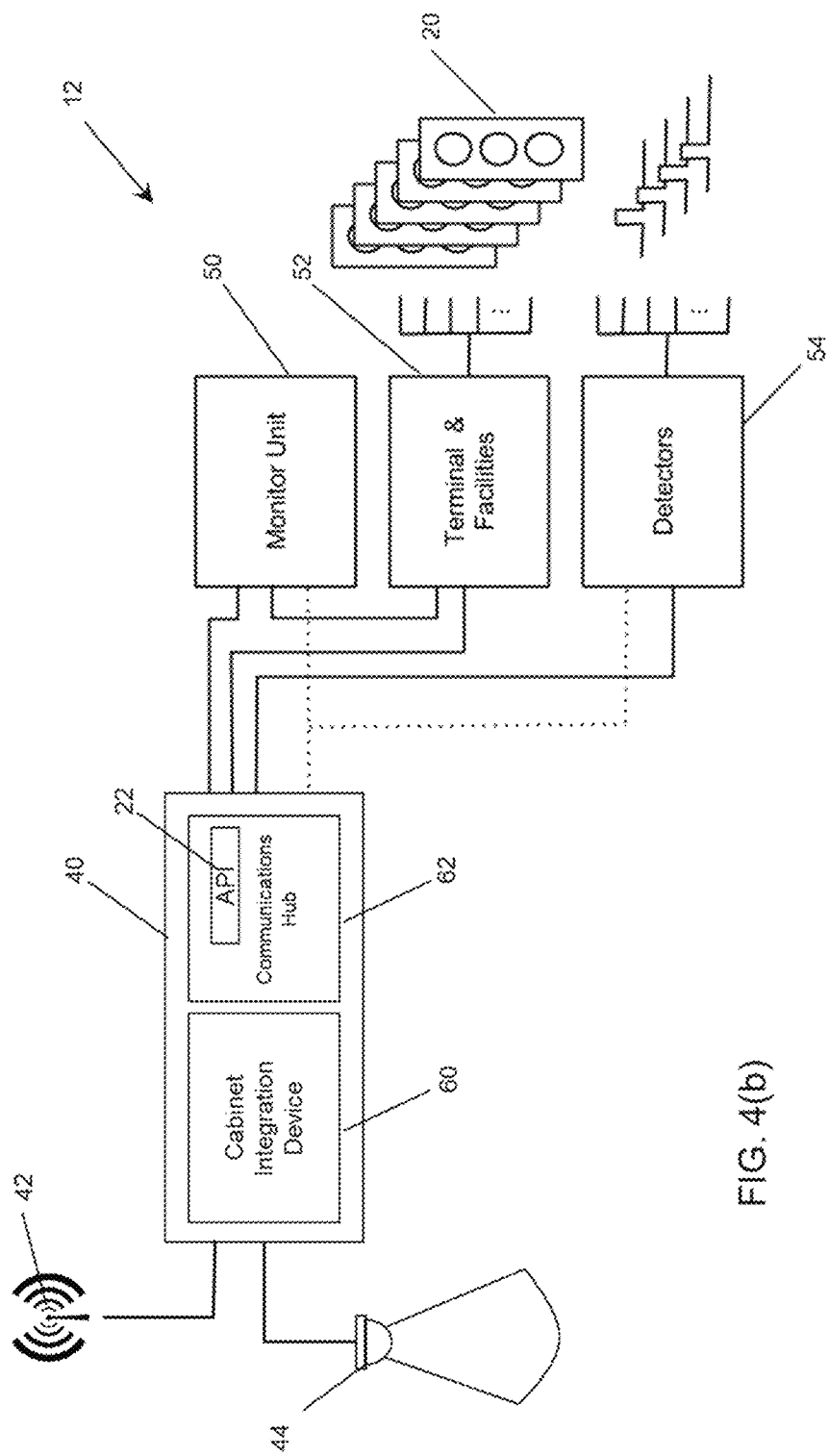
FIG. 4(b) is a block diagram of components in a traffic control cabinet built with a connected intersection module providing wireless connectivity and controller functionality.

FIG. 4(b) illustrates an example adaptation of a connected intersection module 40 in a new cabinet 12 installation or otherwise in a cabinet 12 that does not have or require a controller 30. For example, even existing cabinets 12 having faulty controllers 30 can be upgraded using the connected intersection module 40 without requiring a new controller 30 to be purchased.

FIG. 5 illustrates an example exterior view of the cabinet interface device 60 and the communications hub 62 illustrating the various inputs and outputs. For example, the cabinet interface device 60 includes a series of connectors for enabling the data buses to be input to and output from the connected intersection module 40. The communications hub 62 also includes various data ports 72 as exemplified above. It can be appreciated that the connected intersection module 40 may therefore be deployed in compact and efficient package allowing for ease of installation while fitting within existing cabinets 12 as discussed above.

The connected intersection module 40 is operable to monitor and analyze data and messages within the cabinet 12; report on such data; and, in at least some circumstances, operate as a controller 30. There are various messages that may be present, which are shown in FIGS. 6 and 7.

Figure 6:
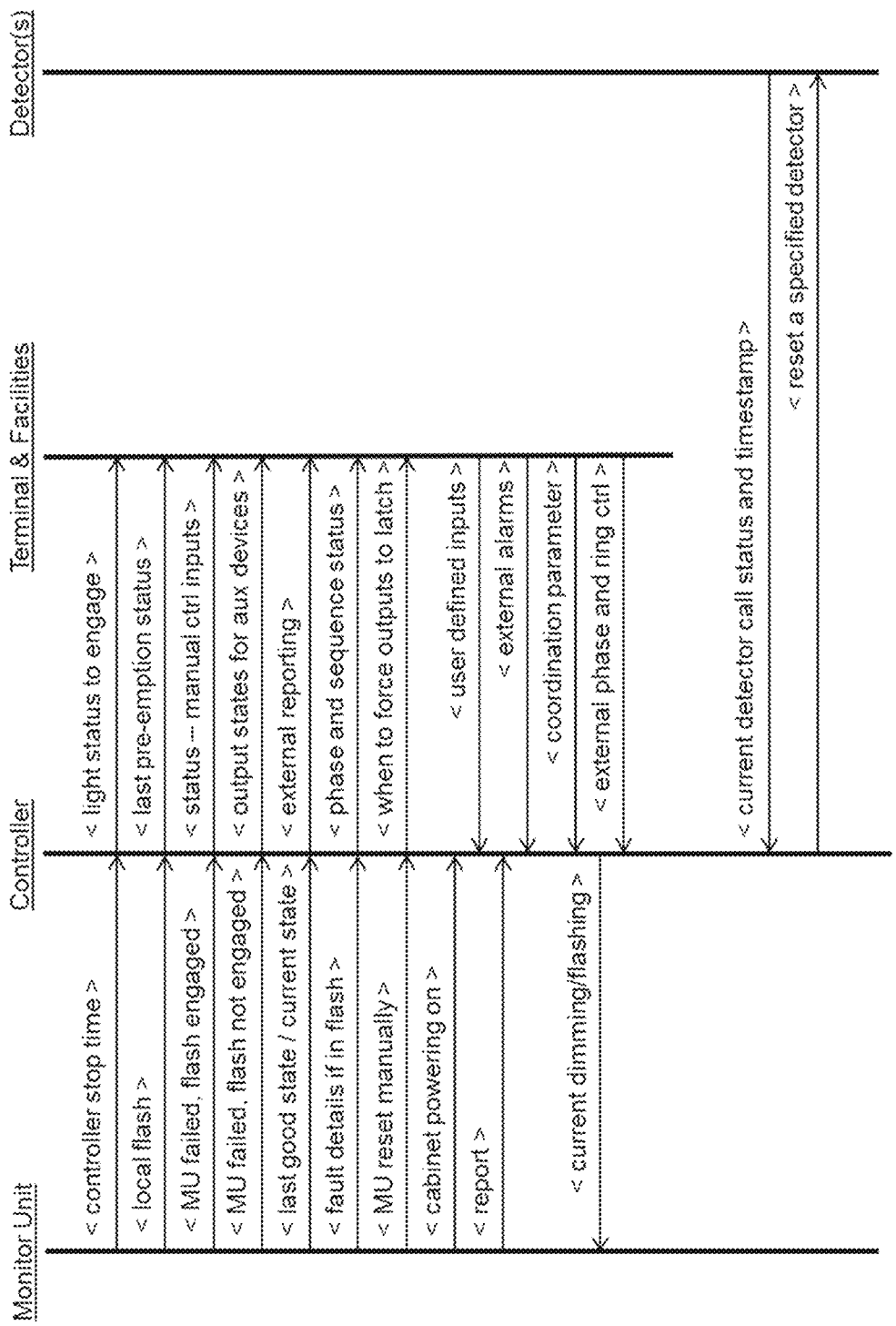
FIG. 6 is a flow diagram illustrating example messages that are exchanged between components in a traffic control cabinet.
Figure 7:
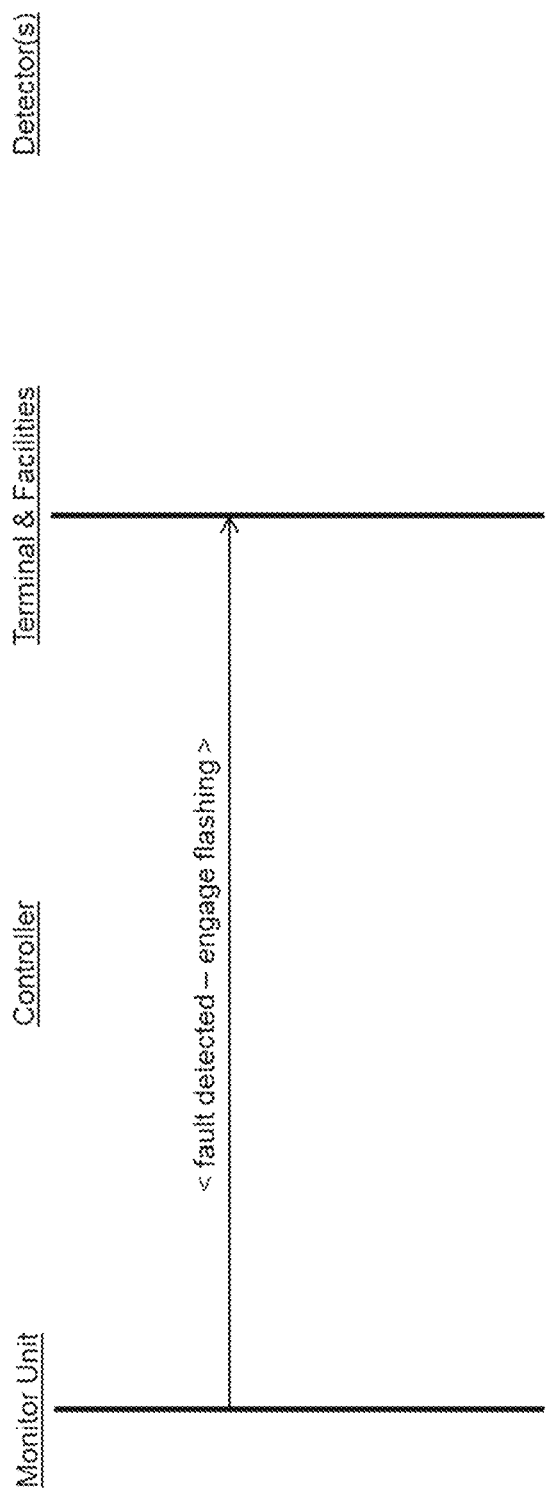
FIG. 7 is a flow diagram illustrating example messages that are exchanged between components in a traffic control cabinet.

Turning first to FIG. 6, the various messages between the controller 30 and the other components within the cabinet 12 are illustrated. Between the monitor unit 50 and the controller 30 the following messages may be present:

MU->Controller: Controller Stop Time/Fault Detected (shown as <controller stop time> in FIG. 6). The controller 30 should cease timing operations when the MU 50 has detected a fault and put the cabinet 12 into a flash state (e.g., burnt bulb, faulty load switch, conflicting signals, bad power, etc.). The connected intersection module 40 would be responsible in this case to log the failure at the intersection 14 and report to a technician on-call, escalating if necessary provide details.

MU->Controller: Local Flash (<local flash>). In this case, the MU 50 has placed the cabinet 12 into a local flash state (either temporarily or until user intervention). The connected intersection module 40 would be responsible in this case to log the failure at the intersection 14 and report to the technician on-call, escalating if necessary.

MU->Controller: MU has failed and flash is engaged (<MU failed, flash engaged>). The connected intersection module 40 would be responsible in this case to log the failure at the intersection 14 and report to the technician on-call, escalating if necessary, and providing details where available.

MU->Controller: MU has failed and flash has not engaged (<MU failed, flash not engaged>). The connected intersection module 40 would be responsible in this case to log the failure at the intersection and report to the technician on-call, escalating if necessary, and providing details where available. Escalation should be immediate due to the unsafe state of the intersection.

MU->Controller: last good state of signals or current state of signals if cabinet not in fault (<last good state/current state>). The connected intersection module 40 would be responsible in this case to log the state of lights 20 for historical analysis or assist in debugging root cause of alarms.

MU->Controller: Fault details if the cabinet is in flash (<fault details if in flash>). Details include but are limited to red failure (includes burnt bulb, faulty load switch), power failure, conflict of signals, minimum clearance time failure and MU diagnostic failure. The connected intersection module 40 would be responsible in this case to log the time and occurrence and report as part of an escalation to provide technician details on failure mode.

MU->Controller: MU has been reset through manual intervention (<MU reset manually>). The connected intersection module 40 would be responsible in this case to log the event for future analysis of failure mode or liability record.

MU->Controller: Cabinet is powering on and Controller should start its start-up flash protocol (<cabinet powering on>). The connected intersection module 40 would be responsible in this case to log the event for liability record.

MU->Controller: MU reports current programmed signal compatibility, and fault detection settings (<report>). The connected intersection module 40 would be responsible in this case to record parameter configuration for remote diagnostics and visualizations.

And for messages going the other way:

Controller->MU: Current dimming/flashing settings for controller to ensure MU does not unintentionally trigger a fault (<current dimming/flashing>). The connected intersection module 40 would be responsible in this case to record parameter configuration for remote diagnostics and visualizations.

Between the MU 50 and the terminal and facilities 52 (see FIG. 7), the following message may be present: MU->T&F: Fault detected engage flashing operation (<fault detected—engage flashing>).

Between the controller 30 and the terminal and facilities 52, the following messages may be present (see again FIG. 6):

Controller->T&F: Light status to engage (i.e. Green, Yellow, Red, Walk, Pedestrian Clear, Don't Walk) (<light status to engage>). The connected intersection module 40 would be responsible in this case to, when acting as a controller, set output to desired control state. The connected intersection module 40 would be responsible in this case to, when acting in read-only mode, record event for historical analysis.

Controller->T&F: Last known pre-emption status (for external reporting to ATMS, Master Controller, or in-field technician) (<last pre-emption status>). The connected intersection module 40 would be responsible in this case to record event for historical analysis.

Controller->T&F: Status of manual control inputs such as dimming, automatic flash, external start, etc. (for external reporting to ATMS, Master Controller, or in-field technician) (<status—manual ctrl inputs>). The connected intersection module 40 would be responsible in this case to record event for historical analysis and potentially raise alarm if maintenance hasn't been scheduled and the state doesn't match an expected state.

Controller->T&F: Programmatic outputs states from controller for auxiliary devices (eg. right turn on red sign) or external reporting to ATMS, Master Controller, or in-field technician (<output states for aux devices>). The connected intersection module 40 would be responsible in this case to record event for historical analysis.

Controller->T&F: Whether the controller is currently coordinated or fully actuated for external reporting to ATMS, Master Controller or in-field technician (<external reporting>). The connected intersection module 40 would be responsible in this case to raise an alarm if intersection is not coordinated as expected.

Controller->T&F: Phase & Sequence status including whether a phase is to be omitted or is next in sequence for external reporting to ATMS, Master Controller, or in-field technician (<phase and sequence status>). The connected intersection module 40 would be responsible in this case to record the event for historical analysis.

Controller->T&F: When to force all signal outputs to latch for signal change (<when to force outputs to latch>). The connected intersection module 40 would be responsible in this case to, when acting as a controller, latch outputs at expected time. The connected intersection module 40 would be responsible in this case to, when acting in read-only mode, record the event for historical analysis to timestamp signal state.

And for messages going the other way:

T&F->Controller: User defined inputs for controller parameter and option selection such as Max Selection, Ring Specific timing stop, Call to Non-Actuation, Pedestrian actuations for external control by ATMS, Master Controller, or in-field technician (<user defined inputs>). The connected intersection module 40 would be responsible in this case to record the event for historical analysis and visualization and, when acting in supplemental control mode, allow remote switching between pre-defined behaviors for the intersection 14.

T&F->Controller: External Alarms (depending on controller action may be taken) for external control by ATMS, Master Controller, or in-field technician (<external alarms>). The connected intersection module 40 would be responsible in this case to record the event for historical analysis and visualization and, when acting in supplemental control mode, allow remote switching between pre-defined behaviors for the intersection 14.

T&F->Controller: Controller coordination parameter selection for external control by ATMS, Master Controller, or in-field technician (<coordination parameter>). The connected intersection module 40 would be responsible in this case to record the event for historical analysis and visualization and, when acting in supplemental control mode, allow remote switching between pre-defined behaviors for the intersection 14.

T&F->Controller: External Phase and Ring control (hold, omit, force off) for external control by ATMS, Master Controller, or in-field technician (<external phase and ring ctrl>). The connected intersection module 40 would be responsible in this case to record the event for historical analysis and visualization, raise an alarm if control does not match expected control and, when acting in supplemental control mode, allow remote switching between pre-defined behaviors for the intersection 14.

Between the controller 30 and the detectors 54, the following messages may be present:

Detector->Controller: current detector call status and timestamp (<current detector call status and timestamp>). The connected intersection module 40 would be responsible in this case to record the event for historical analysis and visualization and, when acting as a controller, respond to calls by placing demand on movements.

And in the other direction:

Controller->Detector: reset a specified detector (<reset a specified detector>). The connected intersection module 40 would be responsible in this case to record the event for historical record and, when acting as a controller, initiate reset for malfunctioning detectors.

The following Table 1 lists example communication buses that are present in the various existing specifications:

TABLE 1

| Cabinet Communication Buses |
| --- |
| NEMA TS1 > |
| Bus # 1 ABCD: MU <-> Controller, Controller <-> Detectors, and Controler <->T&F. |
| Bus #2 MMU Harness: MU <-> T&F. |
| NEMA TS2 Type 1 > |
| Bus # 1 SDLC: MU <-> Controller, Controller <-> Detectors, Controler <->T&F. |
| Bus #2 MMU Harness: MU <-> T&F. |
| NEMA TS2 Type 2 > |
| > Configuration 1 : ABCD + CMU + Detectors(SDLC) |
| Bus #1 ABCD Harness: MU <-> Controller, Controller <->T&F |
| Bus #2 SDLC : Controller <-> Detectors |
| Bus #3 CMU Harness: MU <-> T&F. |
| > Configuration 2 : ABCD + MMU(SDLC) + Detectors(SDLC) |
| Bus #1 ABCD Harness: Controller <->T&F |
| Bus #2 SDLC : MU <-> Controller, Controller <-> Detectors |
| Bus #3 CMU Harness: MU <-> T&F. |
| 170/2070 > |
| Bus #1 C1/C11 : Controller <-> Detectors, Controller <->T&F, MU <-> Controller |
| Bus #2 MU Harness: MU <-> T&F. |
| ATC > |
| Bus #1 SDLC SB#1: MU <-> Controller, Controller <-> Detectors, Controller <->T&F. |
| Bus #2 SDLC SB#3: MU <-> T&F |
| Bus #3 MU Harness: MU <-> T&F. |

Various operations performed by the connected intersection module 40 will now be illustrated.

FIG. 8 illustrates example computer executable instructions for monitoring data at a traffic cabinet 12 and reporting the data to a traffic operations center 16. At step 100 cabinet data is monitored by the connected intersection module 40 and the cabinet data is logged or otherwise stored or recorded at step 102. In this example, the stored data is reported to the traffic operations system 16, e.g. by generating one or more reports, performing a file transfer of the data in raw format, etc. The traffic operations system 16 receives the reports at step 106, processes and/or stores the reports at step 108, and enables the data to be used by a user interface at step 110. Step 110 may be performed using cloud-based traffic management software as exemplified below and shown in the screen shots included in FIGS. 12 to 28.

FIG. 9 illustrates example computer executable instructions for generating a notification in response to a detected alarm or fault. At step 130 such an alarm or fault is detected. The connected intersection module 40 may then determine at step 132 a notification recipient (e.g., traffic control personnel, maintenance technician, etc.), and sends a notification to that recipient at step 134, e.g., via email, text message, instant message, voice mail, etc. The alarm or fault is also logged or otherwise stored or recorded at step 136, e.g., for historical analysis, periodic reporting, etc.

Figure 10:
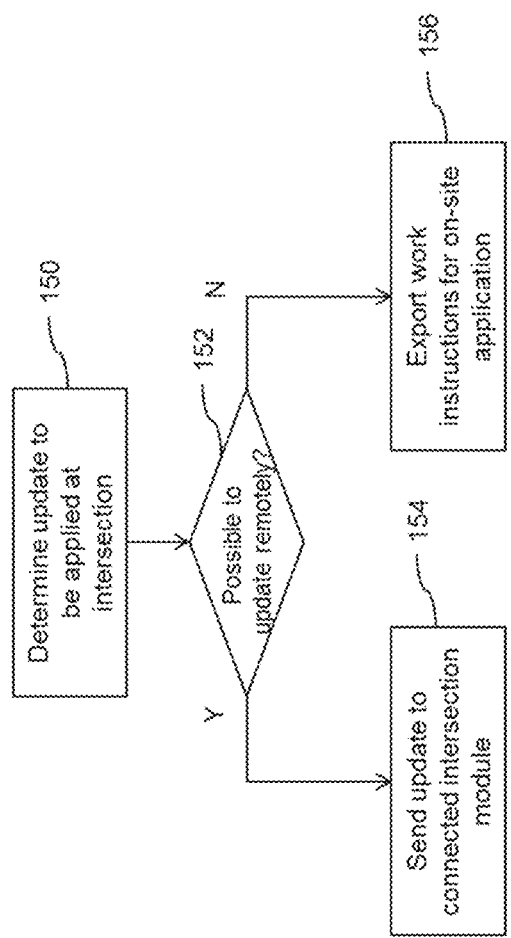
FIG. 10 is a flow chart illustrating example computer executable instructions for generating an update for a connected intersection module.

FIG. 10 illustrates example computer executable instructions for generating an update for a connected intersection module 40. These operations can be performed by a technician or administrator, or customer, using the cloud-based software capabilities and connectivity, e.g., via the traffic operations system 16. At step 150 the system 16 determines which update is to be applied at the particular intersection 14 (e.g., via a manual input, automatic routine, etc.). At step 152 it is determined whether or not the update can be deployed remotely. For example, certain upgrades may require a technician according to certain regulations, the cabinet 12 may be out-of-network-communication, etc. If the update can be performed remotely, the update is sent to the connected intersection module 40 at the intersection 14 at step 154. If not, work instructions can be exported (e.g., printed, saved, emailed, etc.) for on-site application. It can be appreciated that steps 150, 152 (Y) and 154 can also be implemented for bridging or otherwise connecting to or communicating with any $3^{rd}$ party software or device deployed in the cabinet 12 as discussed above.

Figure 11:
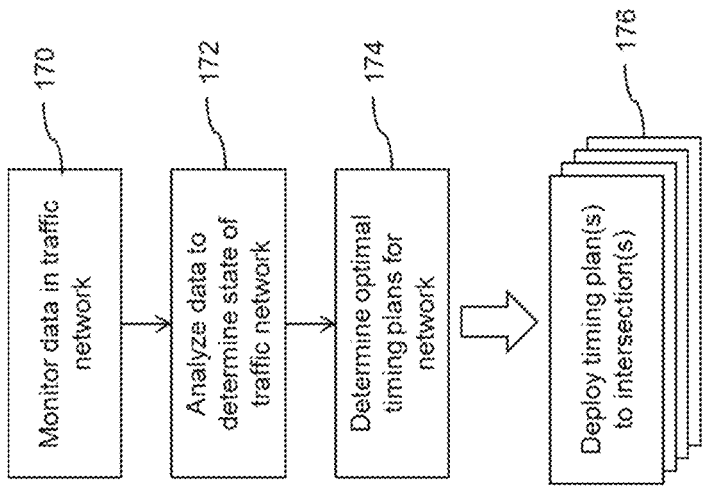
FIG. 11 is a flow chart illustrating example computer executable instructions for generating updated signal timing plans for connected intersections.

FIG. 11 illustrates example computer executable instructions for generating updated signal timing plans for connected intersections. At step 170 data in the traffic network 10 (e.g., that data which has been regularly reported by the connected intersection modules 40) is monitored in order to analyze the data at step 172 to determine the state of the traffic network 10. From this, the optimal timing plan(s) can be determined for the network 10 at step 174 such that timing plans can be deployed to the particular intersections 14 at step 176.

Turning now to FIGS. 12 through 28, several screen shots are shown illustrating functionality that can be provided by one or more user interfaces at the traffic operations system 16. It can be appreciated that similar software can also be provided via any cloud-based server or service connectable to the network 16 and thus able to connect to the connected intersection module 40 and the cabinets 12 within a traffic network 10.

Figure 12:
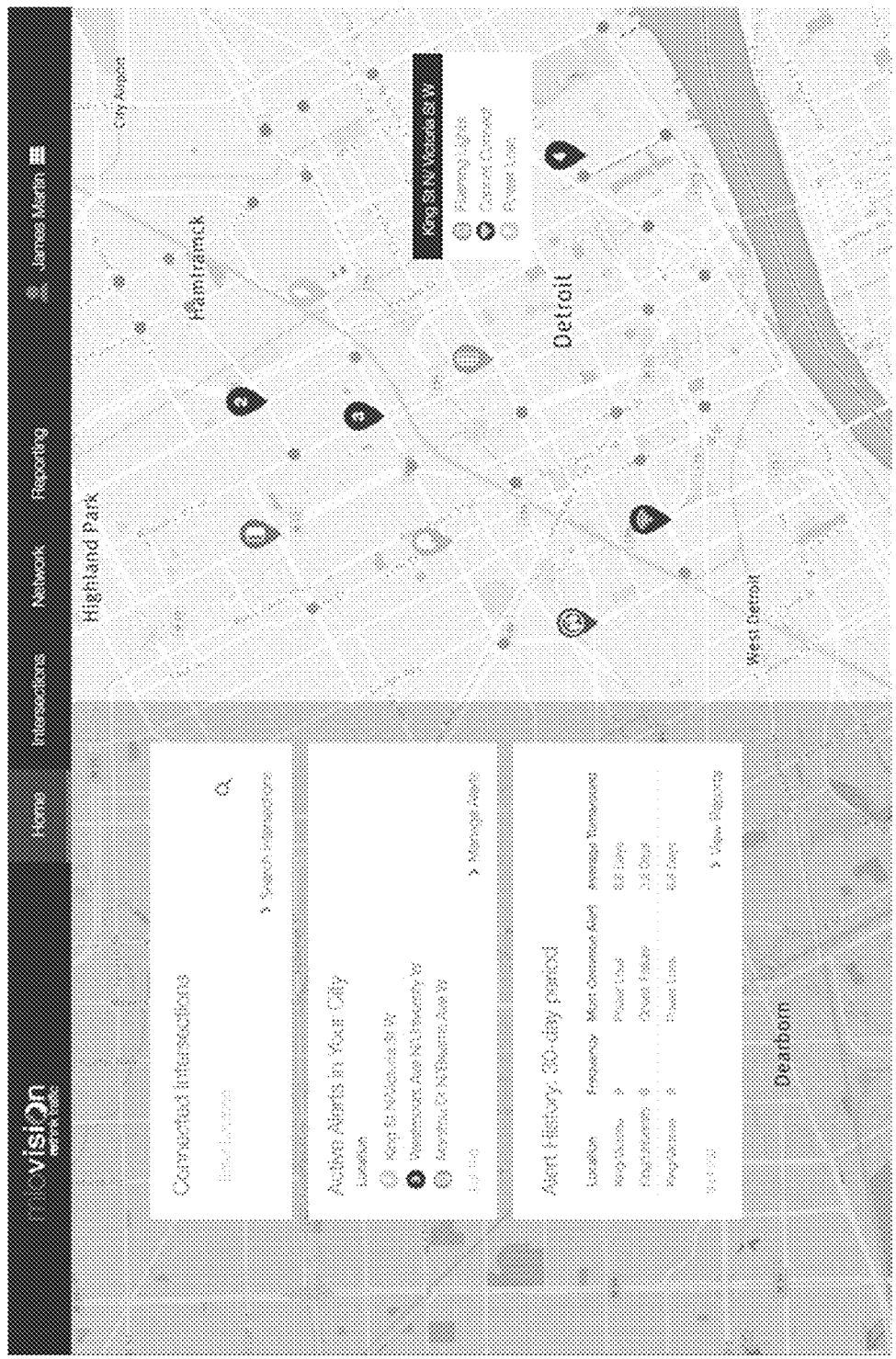
FIG. 12 is a screen shot of an example of a user interface for a connected intersections map view.

FIG. 12 illustrates a screen shot of a connected intersection user interface screen, which includes a map of a particular traffic network that is currently overlaid by a home tab. The home tab includes a search function to search for a particular connected intersection 14, an active alerts summary, and an alert history summary. In this example, the active alerts summary enables the user to select a "Manage Alerts" option to obtain further details regarding the alerts that are listed. The alert history summary in this example is set to show a 30-day period and includes a "View Reports" option that can be selected by a user to view the various alert-related reports that can be generated.

Figure 13:
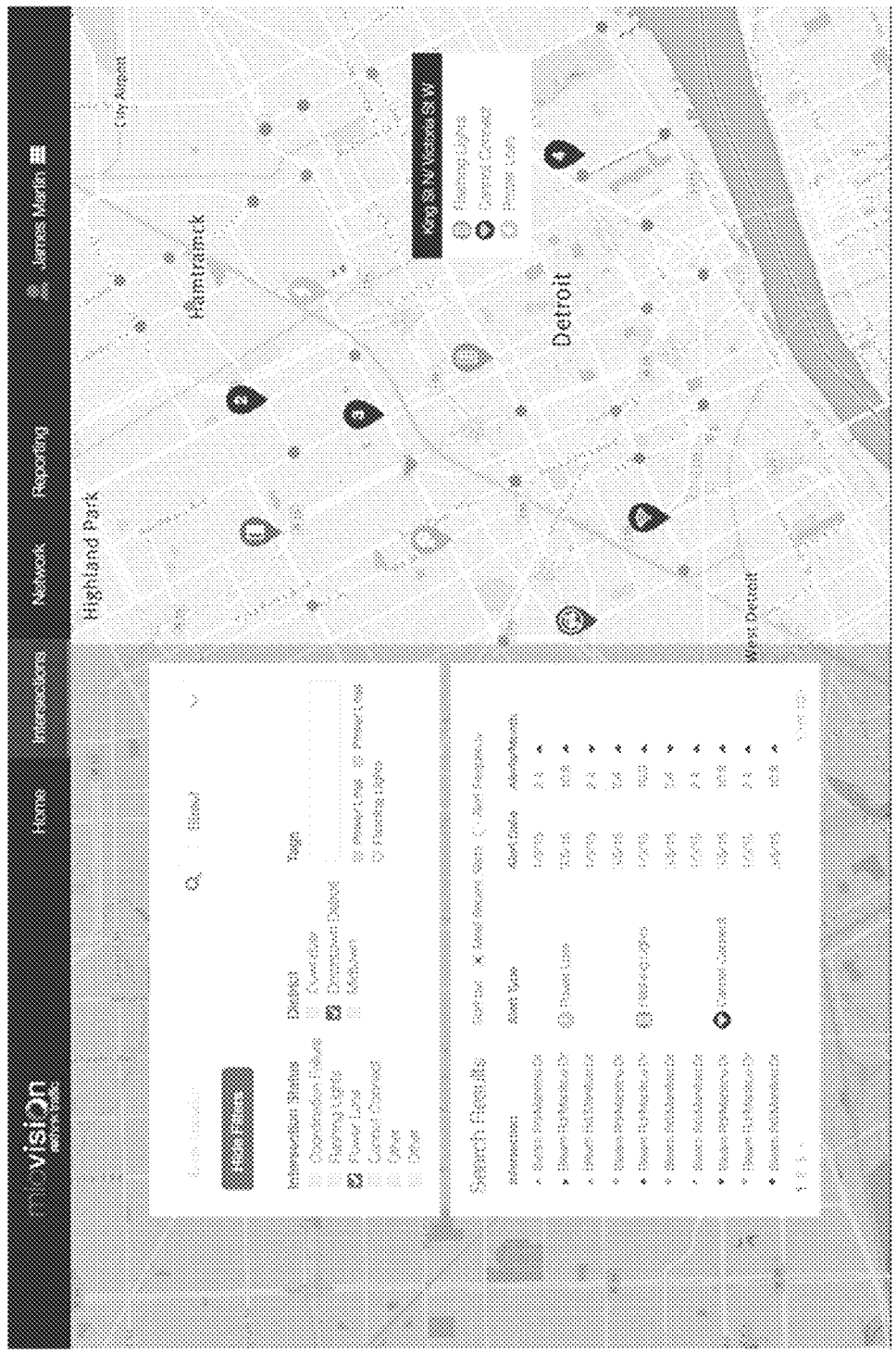
FIG. 13 is a screen shot of an example of a user interface illustrating a connected intersections alerts search result.
Figure 14:
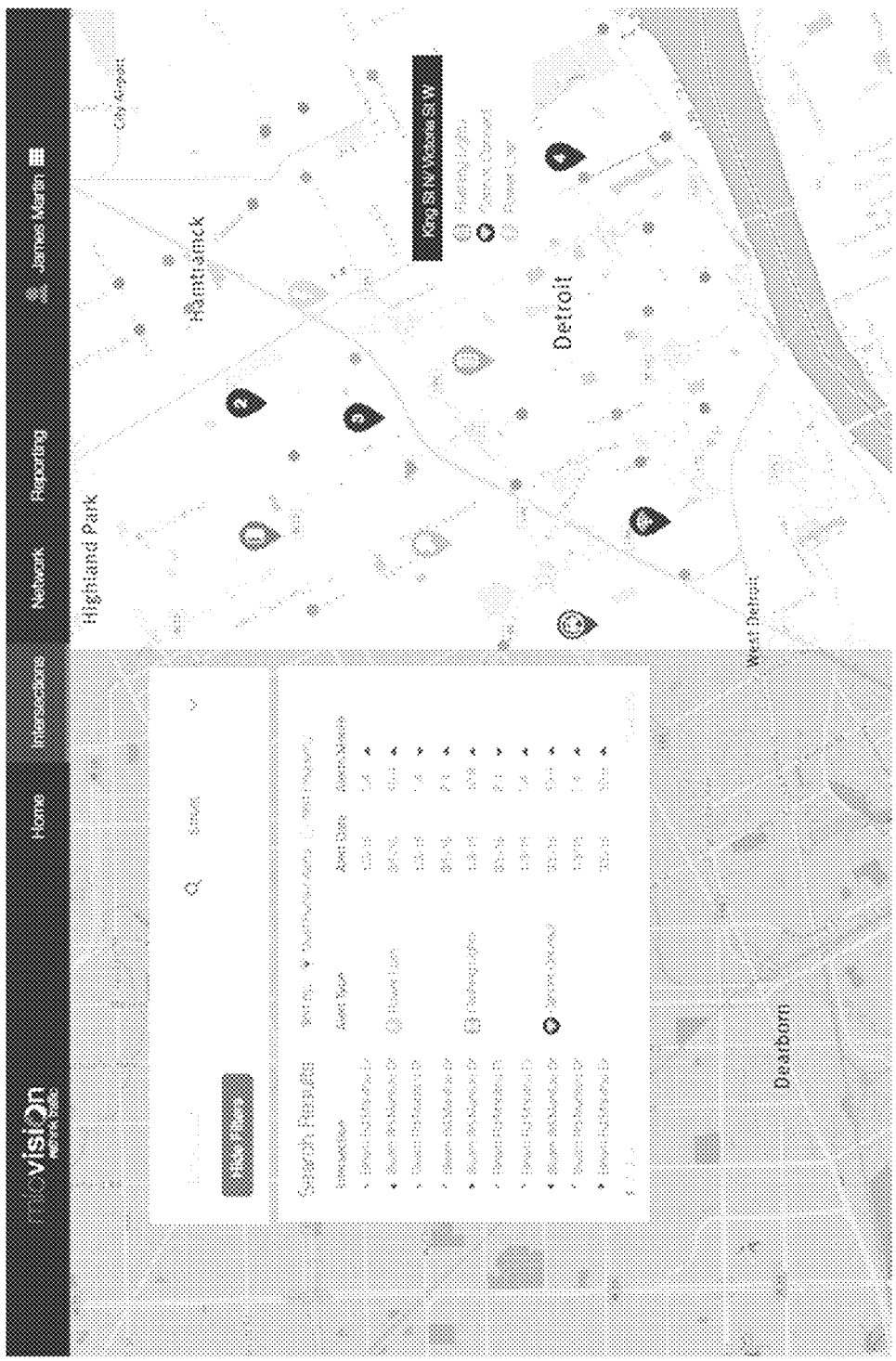
FIG. 14 is a screen shot of an example of a user interface illustrating a connected intersections alerts search result.

FIG. 13 illustrates an intersections tab in the user interface screen. The intersections tab provides a location search function with a set of filters that can be applied, for example, to filter for intersections 14 having a power loss or that are located within a particular section of the city. A search results list is also shown in FIG. 13. FIG. 14 also illustrates the intersections tab, but with the filters hidden. It can be appreciated that the search and filtering options provided by the intersections tab enables a user to visualize the "health" of the intersections 14 within a traffic network 10.

Figure 15:
FIG. 15 is a screen shot of an example of a user interface for a connected intersections alerts report.

FIG. 15 illustrates an intersection alerts view, which in this example provides an alert report and an alert trends chart to show the number of occurrences of different types of alerts over a particular period of time. The alert report provides current alerts and alert history data. It can be appreciated that various factors such as the environment, vandalism or equipment failure due to aging infrastructure can occasionally interrupt the operation of an intersection 14. Examples of the types of failures that can occur are: power outages, communication failures, conflict flash mode (i.e. flashing red signals), cabinet door opening unexpectedly, and coordination failure. With any of these events, the performance of the intersection network 10 can suffer and potentially create unsafe conditions. An important responsibility of a traffic operations team is to minimize the length of such inconvenient and potentially unsafe down-time periods. The ability to view reports and alerts such as those illustrated in FIG. 15, as well as built-in alarm notifications as discussed above provides the necessary information to react as quickly as possible to these events.

Figure 16:
FIG. 16 is a screen shot of an example of a user interface for a connected intersections telemetry view visualizing traffic signals.
Figure 18:
FIG. 18 is a screen shot of an example of a user interface for a connected intersections telemetry view displaying an intersection video.

FIG. 16 provides an intersection telemetry view which provides a real-time visualization of intersection telemetry activity. For example, as shown in FIG. 16, the light status can be seen as well as a timeline for the alerts at that intersection. In this way, in addition to enabling a rapid response to intersection alerts, live and historical monitoring of signal-phasing and vehicle-detection actuations can be provided. Where the appropriate hardware is installed, live and historical video can also be viewed as shown in FIG. 18, discussed below. Access to this type of data can be valuable in a number of applications, including without limitation: improving signal timing plans to increase intersection level of service, diagnosing intersections with failed vehicle detection devices, and aiding in the resolution of citizen complaints and safety investigations.

Figure 17:
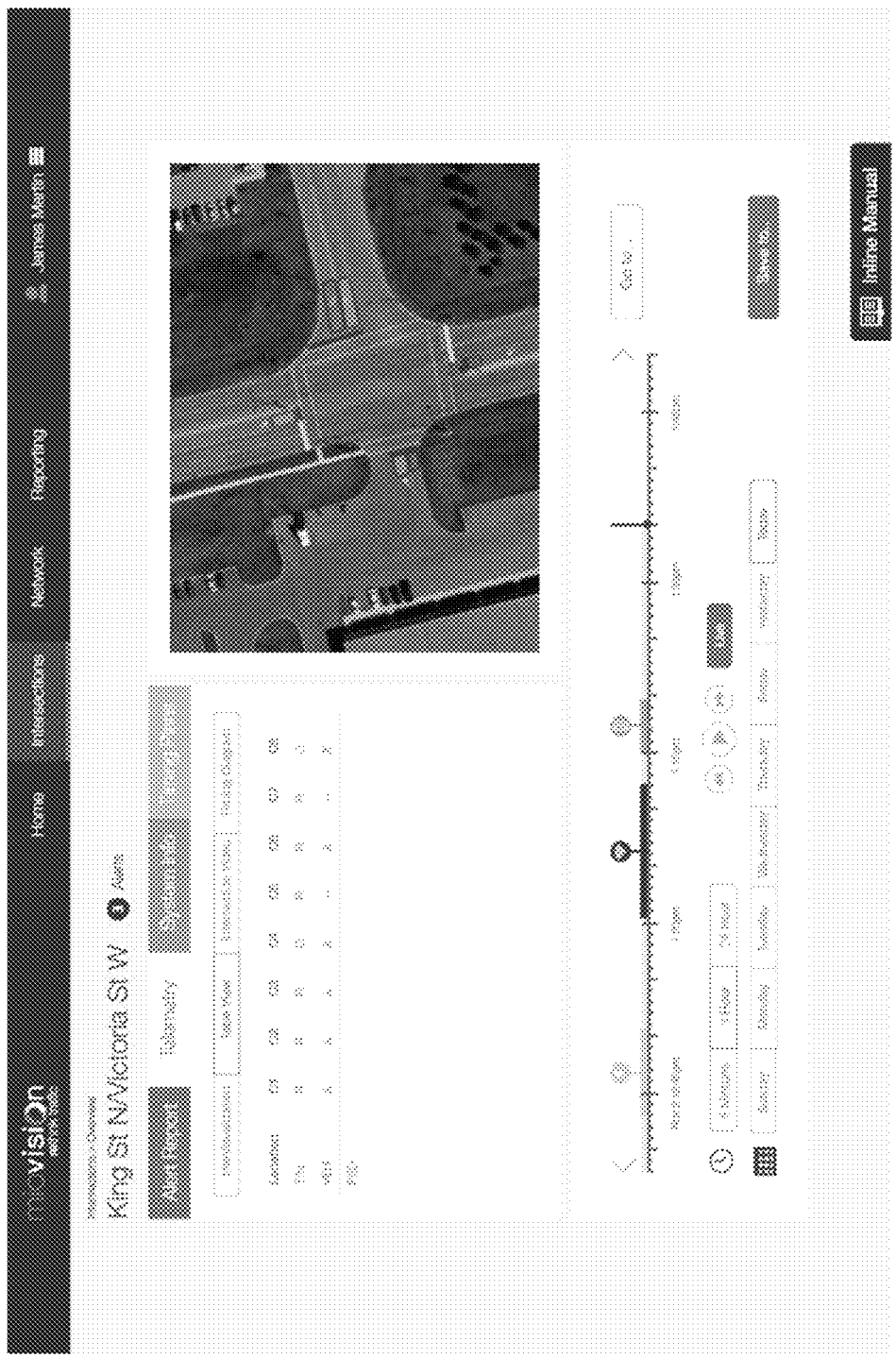
FIG. 17 is a screen shot of an example of a user interface for a connected intersections telemetry view showing a table view.

FIG. 17 illustrates another tab in the telemetry view, namely a table view to provide an alternative visualization for telemetry activity. Intersection video, both real-time and historical, may also be viewed in the telemetry view, as shown in FIG. 18, by selecting an intersection video tab. As shown in FIG. 18, video in its raw spherical form, as well as rectified video can be provided via the user interface. The cloud-based service provided to a customer can be configured to allow various levels of video streaming (numbers of hours), that can be used as a pool across any of the connected intersections 14.

Figure 19:
FIG. 19 is a screen shot of an example of a user interface for a connected intersections telemetry view displaying a timing diagram.
Figure 20:
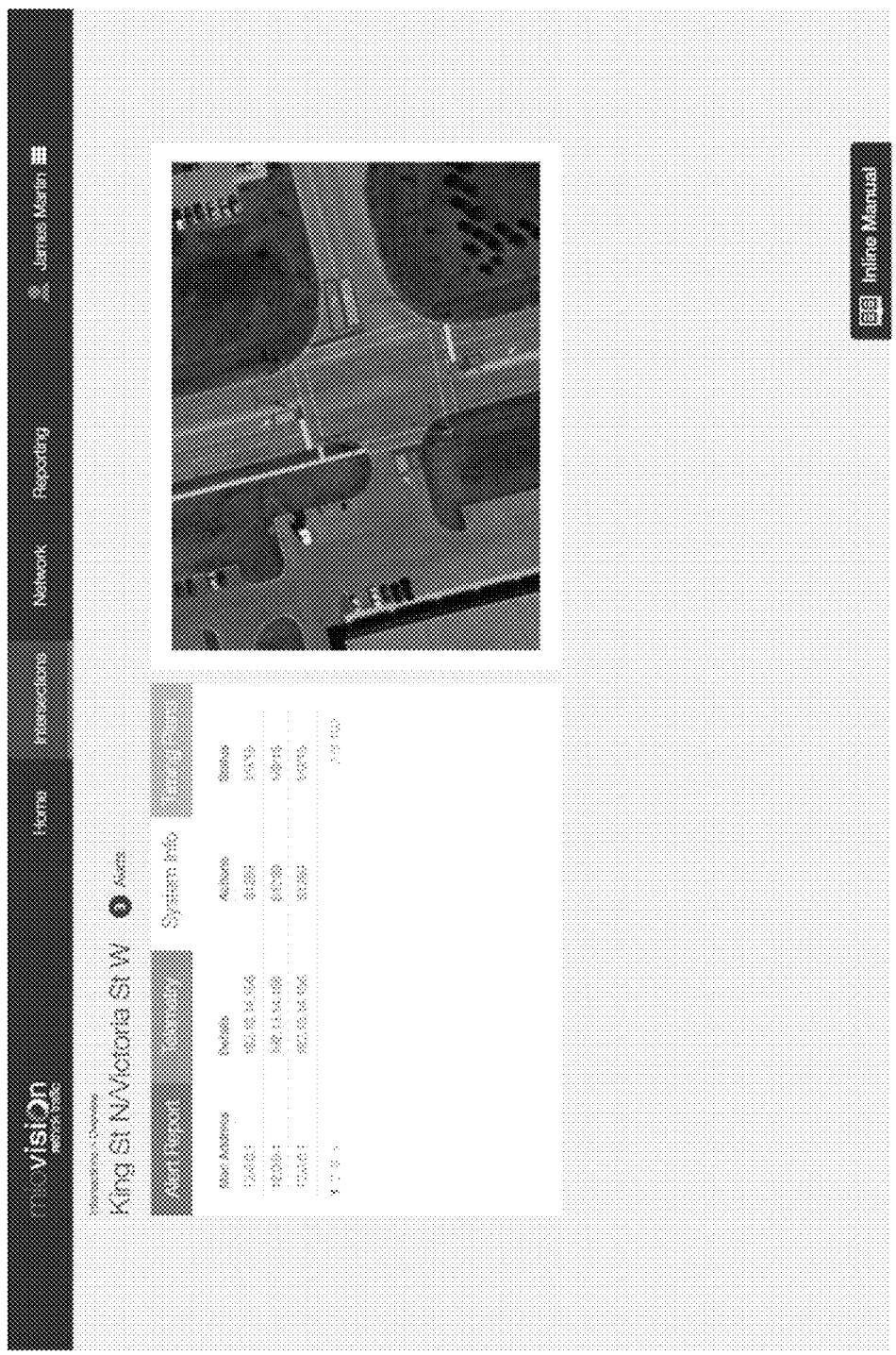
FIG. 20 is a screen shot of an example of a user interface for a connected intersections telemetry view illustrating system info.

FIG. 19 illustrates a timing diagram accessed within the telemetry view, providing yet another way to visualize activity at an intersection 14. FIG. 20 illustrates a system information view, which can be used to access MAC or IP addresses associated with the communication hubs 62 at the intersections 14.

Figure 21:
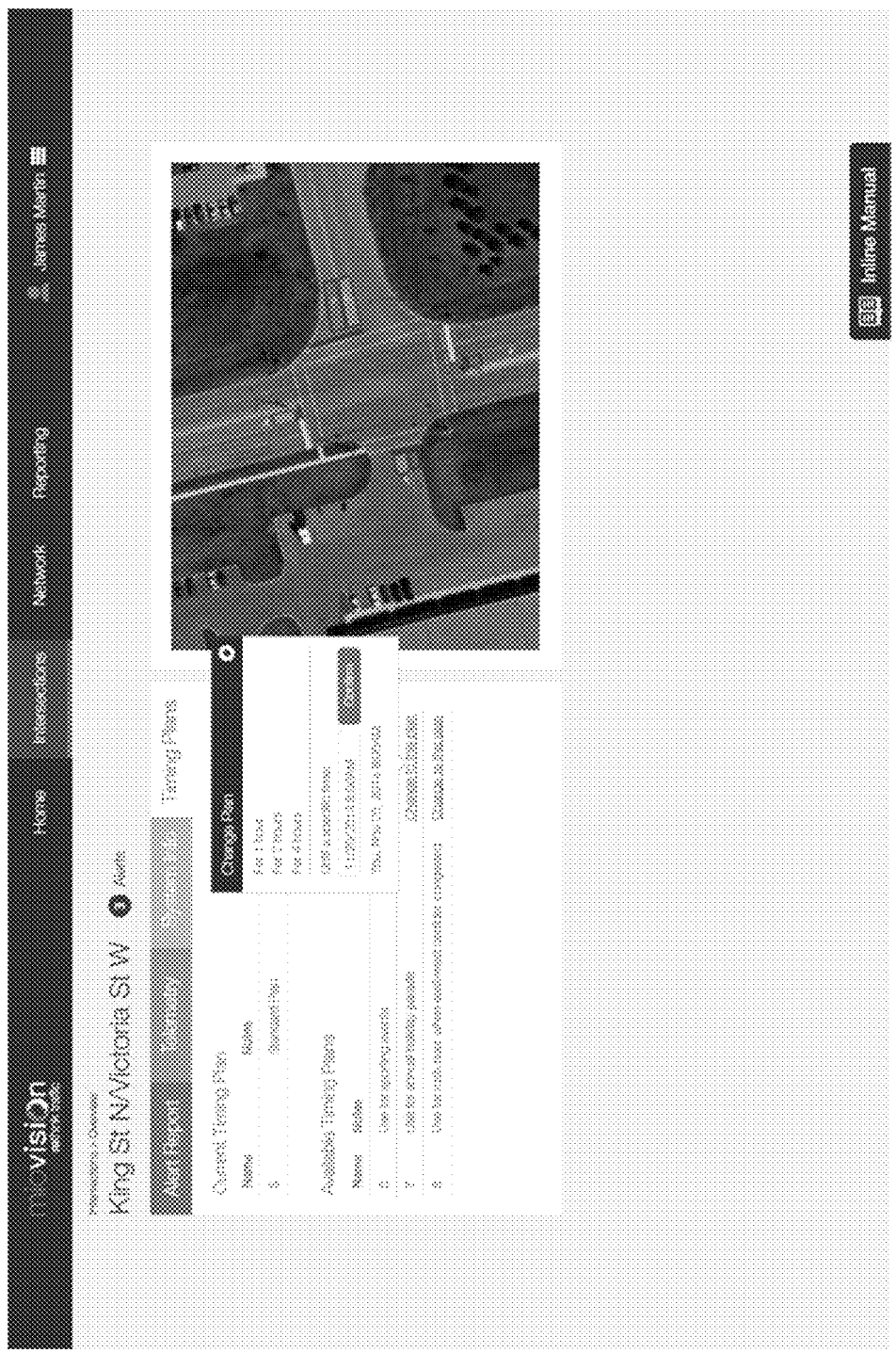
FIG. 21 is a screen shot of an example of a user interface for a connected intersections timing plan management view.

FIG. 21 provides an intersection timing plan management view to enable traffic operations to manage timing plans directly from within the software. Due to the connectivity provided by the connected intersection modules 40, remote updating of timing plans are possible via the timing plan management functionality. As discussed above, the timing plan management functionality can be achieved even when it is not possible to remotely update a particular intersection 14, by exporting timing plans into work instructions that can be shared with maintenance staff to drive timing plan changes at the roadside.

Figure 22:
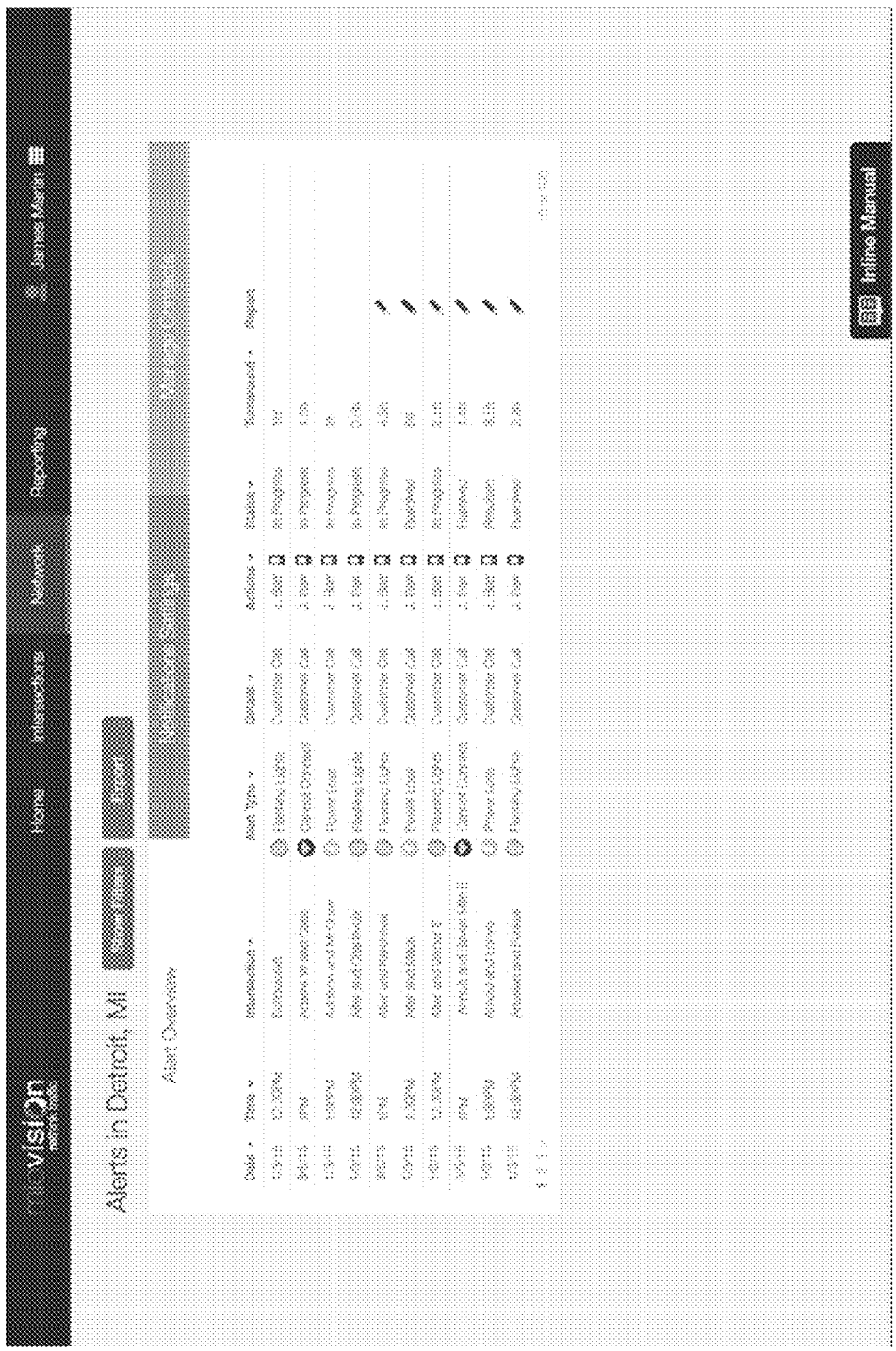
FIG. 22 is a screen shot of an example of a user interface for a connected intersections alerts overview.
Figure 23:
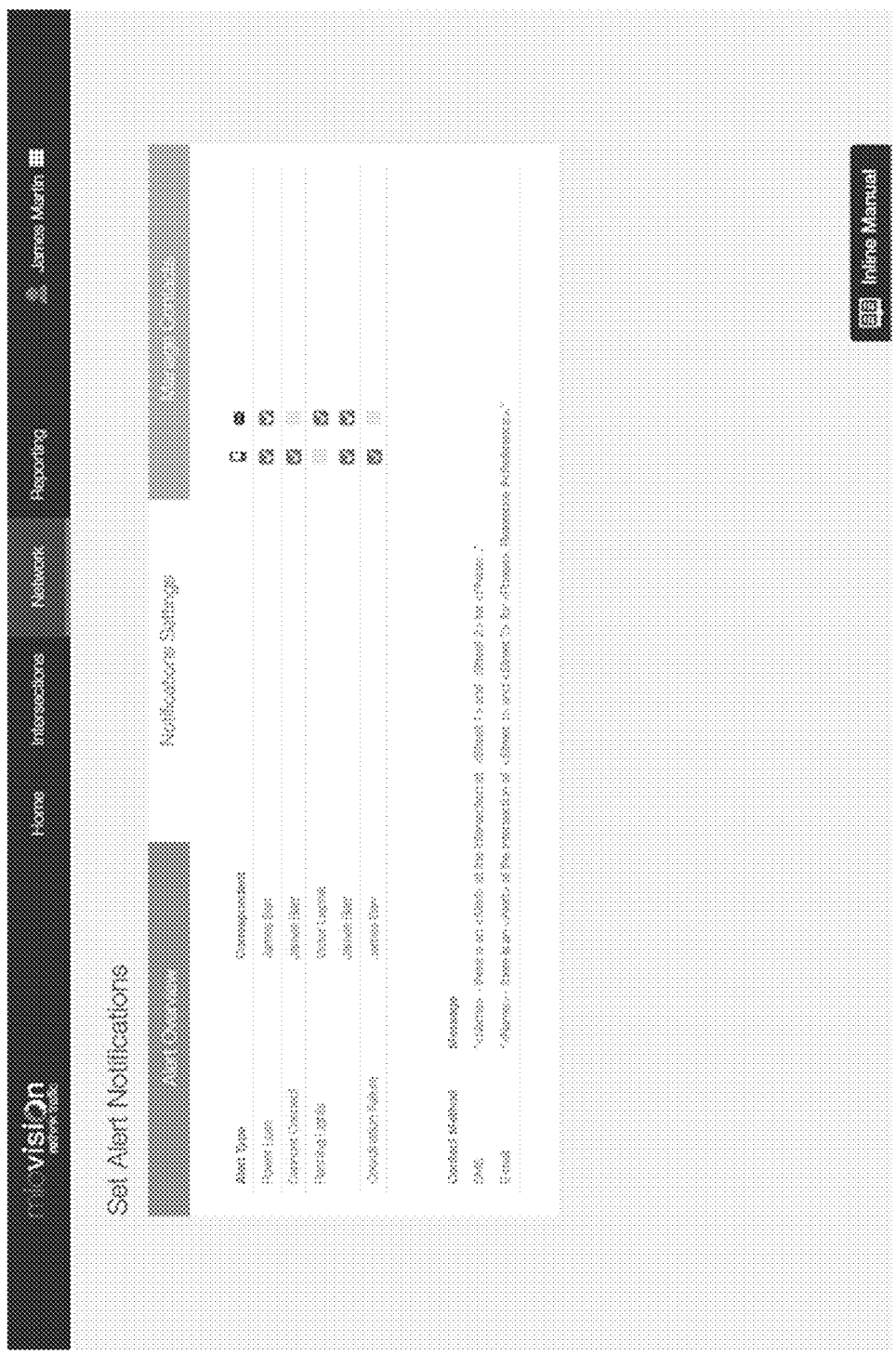
FIG. 23 is a screen shot of an example of a user interface for a connected intersections alert notifications settings.
Figure 24:
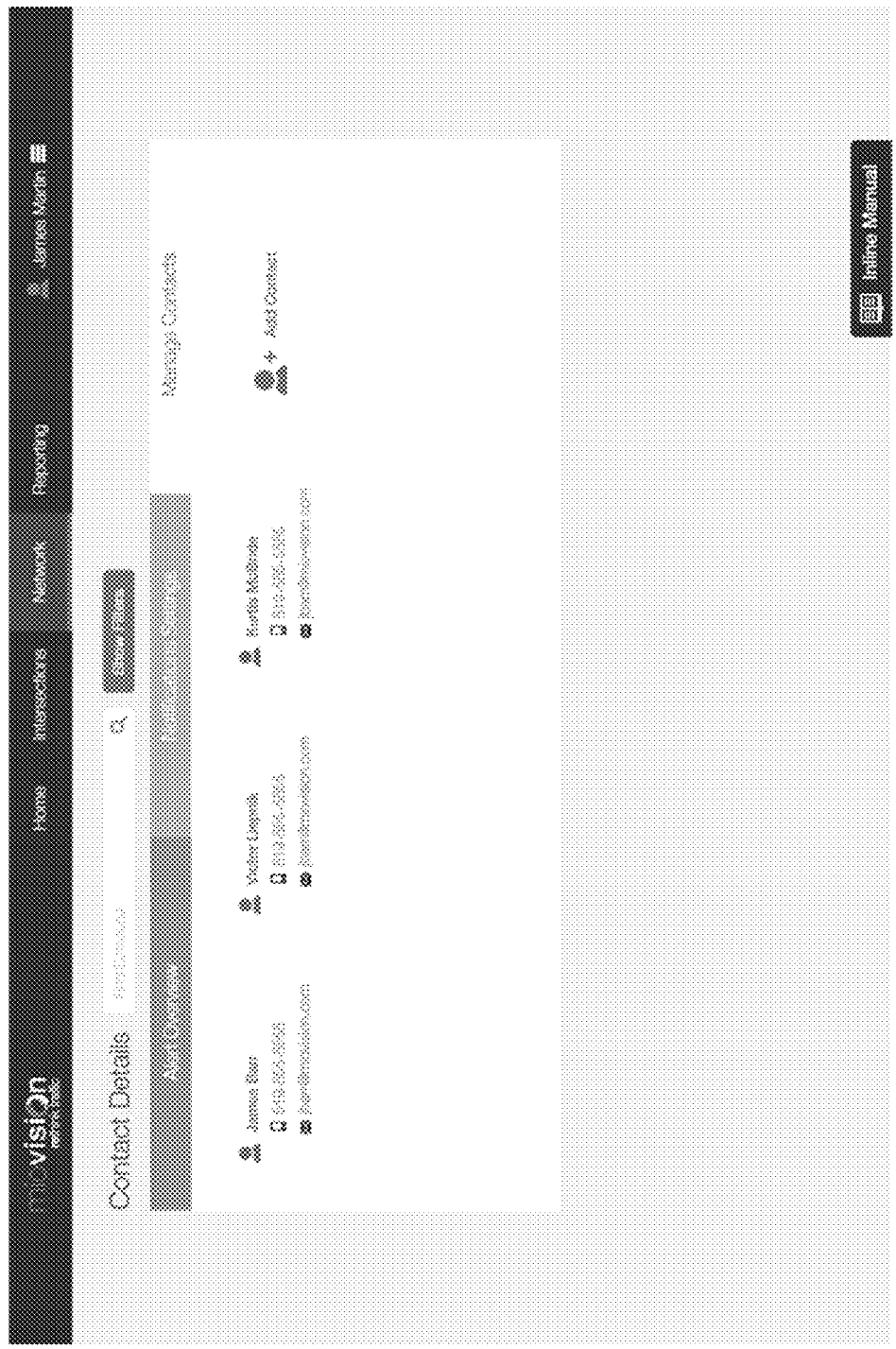
FIG. 24 is a screen shot of an example of a user interface for a connected intersections contact management view.

A network tab is also provided in the connected intersection user interface screen, which when selected as shown in FIG. 22 allows alerts overviews, notification settings, and contact management options to be accessed. FIG. 22 illustrates an alerts overview that can provide current and historical alert data in the associated traffic network 10. The notifications settings are shown in FIG. 23. In this example, text message or email message options can be selected for various technicians. This allows customizable alert notifications to be sent using the appropriate medium for each technician. Notification triggers can also be set by time of day, alert type and intersection group. In addition, options can be provided allowing for the tracking of the status of an alert to ensure that these types of incidents are resolved. For example, escalation of the alert can be performed when the status shows that the alert has not been resolved after a predetermined amount of time. FIG. 24 illustrates a manage contacts view that allows contacts to be added and addressing (e.g. phone numbers, email addresses, etc.) to be edited, added, deleted, etc.

Figure 25:
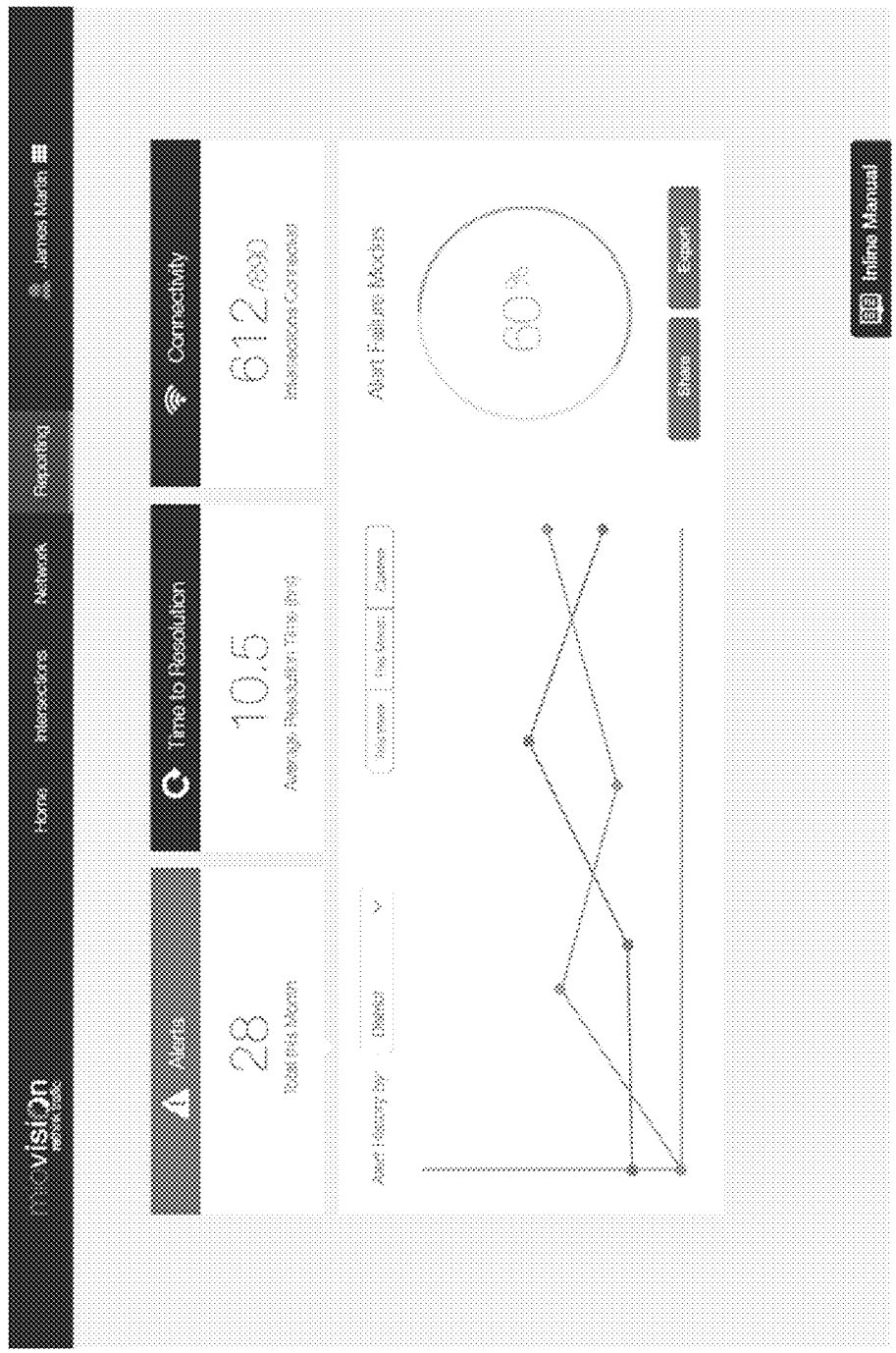
FIG. 25 is a screen shot of an example of a user interface for a connected intersections alerts report dashboard showing alert history.
Figure 26:
FIG. 26 is a screen shot of an example of a user interface for a connected intersections alerts report dashboard showing turnaround time.
Figure 27:
FIG. 27 is a screen shot of an example of a user interface for a connected intersections alerts report dashboard showing offline time by district.

FIGS. 25 to 27 illustrate a reports dashboard, accessed by a "Reporting" tab in the connected intersection user interface screen. The reporting dashboard enables historical alert trends to be viewed and analyzed, turnaround times to be determined, city connectivity to be determined among other things. The reporting capabilities can provide summary information about the number of intersections 14 that are connected in the network 10, the number and type of alerts that the network 10 has experienced (in a period of time, per intersection grouping, etc.), and reports about the length of time that it takes to resolve an alert, i.e. the aforementioned turnaround time. Trends can be graphed to enable users to quickly determine if a specific failure model is improving or deteriorating. These reports can also be used to better understand trends in the state of an ageing infrastructure, find areas to improve operational response times, and can assist in the annual capital planning process to ensure that funds are being spent addressing intersections 14 with the highest rates of failure (i.e. rather than simply replacing infrastructure based on age). FIG. 25 illustrates an alert history graph and visualizes the alert failure modes, FIG. 26 illustrates time to resolution graphical information, and FIG. 27 provides a visual depiction of connectivity according to offline time.

Figure 28:
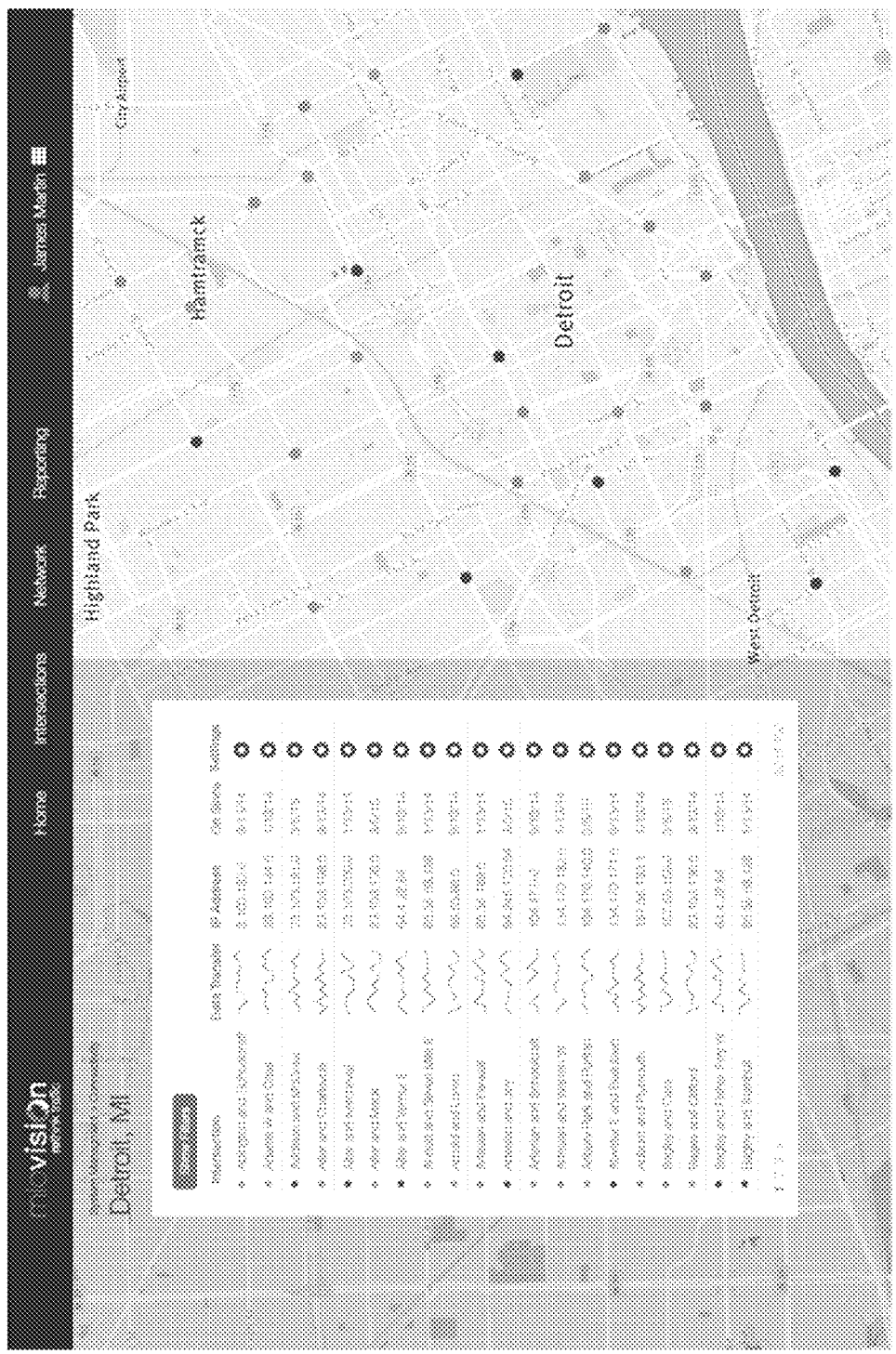
FIG. 28 is a screen shot of an example of a user interface for a connected intersections connectivity map view.

FIG. 28 illustrates a connectivity map view to enable users to visualize the connectivity of the intersections 14 in the network 10. Many agencies have existing central management systems, and managing signals from a single common interface is considered to be preferable to having multiple systems for different parts of a network 10. The connected intersection software can be configured to support the ability to integrate legacy traffic cabinet hardware with existing central management systems. This can be achieved by enabling serial communications over a cellular (e.g. 4G LTE) network. Limited configuration is required to enable this communication mode with the connected intersection modules 40 being used to retrofit the legacy hardware. In addition to being able to provide connectivity to the controller 30, the connected intersection module 40 can also provide connectivity to other devices in the cabinet 12 that have Ethernet or serial ports. These devices can then be interfaced with from an office, remotely, instead, or going to the roadside.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the connected intersection module 40, traffic operations system 16, or any other device in the network 10, any component of or related to thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for enabling wireless communication with and control of traffic control cabinets in a traffic network, the system being configured to adapt a traffic control cabinet utilizing legacy technology and comprising:
    a cabinet adapter device comprising: i) at least one interface with a communication bus within the cabinet for communicating with an existing traffic controller in the traffic cabinet, and at least one of a monitor unit, terminal and facilities, and detectors in the cabinet, and ii) a module configured to interpret legacy signals and protocols normally handled by the existing traffic controller; and
    a communications hub coupled to the cabinet adapter device, the communications hub comprising a wireless network interface and an application programming interface for enabling remote wireless communications to and from the system and for interacting with the existing traffic controller, and the at least one of the monitor unit, the terminal and facilities, and the detectors in the cabinet by a traffic operations system.

2. The system of claim 1, wherein the cabinet adapter device intercepts signals from the existing traffic controller.

3. The system of claim 1, wherein the cabinet adapter device and communications hub transform the legacy signals and protocols into a unified language to enable interfacing between heterogeneous traffic infrastructure across the traffic network and a homogeneous wireless communication protocol.

4. The system of claim 1, further comprising a camera for capturing video at an intersection.

5. The system of claim 1, further comprising at least one communication port and a serial protocol transformation module for communicating with at least one serial device in the cabinet and transforming serial communications from the at least one serial device into a wireless protocol utilized by the communications hub.

6. The system of claim 5, wherein the at least one communication port is configured to interface with third party software over an internet or cellular connection to provide virtual device interfaces.

7. The system of claim 1, further comprising at least one communication port for communicating with at least one internet protocol (IP) device in the cabinet via the communications hub.

8. The system of claim 1, wherein the cabinet adapter module is further configured to be deployable in a traffic cabinet that does not include the existing traffic controller, to perform traffic controller operations.

9. A method of monitoring data in a traffic control cabinet in a traffic network, the traffic control cabinet utilizing legacy technology, the method comprising:
    monitoring and interpreting legacy signals and protocols normally handled by an existing controller in the traffic cabinet, and storing cabinet data using a cabinet adapter device comprising: i) at least one interface with a communication bus within the cabinet for communicating with an existing traffic controller in the traffic cabinet, and at least one of a monitor unit, terminal and facilities, and detectors in the cabinet, and ii) a module configured to interpret the legacy signals and protocols; and
    sending a report comprising the cabinet data wirelessly to a traffic operations system, using a communications hub coupled to the cabinet adapter device, the communications hub comprising a wireless network interface and an application programming interface for enabling remote wireless communications to and from the communications hub, and for interacting with the existing traffic controller, and the at least one of the monitor unit, the terminal and facilities, and the detectors in the cabinet.

10. The method of claim 9, further comprising:
    receiving, by the traffic operations system, the report sent by the communications hub;
    processing operational traffic data in the report; and
    enabling the operational traffic data to be used in a user interface for communicating with or controlling at least one traffic cabinet in the traffic network.

11. The method of claim 10, wherein if at least two of the traffic controller, the monitor unit, the terminal and facilities, and the detectors in the cabinet are connected, the method further comprises enabling visualizations in the user interface of current state and evolution in time of fused cabinet data from the at least two connected devices.

12. A method of monitoring data in a traffic control cabinet in a traffic network, the traffic control cabinet utilizing legacy technology, the method comprising:
    detecting an existing system alarm or fault in the operation of the traffic control cabinet or devices therein using a cabinet adapter device comprising: i) at least one interface with a communication bus within the cabinet for communicating with an existing traffic controller in the traffic cabinet, and at least one of a monitor unit, terminal and facilities, and detectors in the cabinet, and ii) a module configured to interpret legacy signals and protocols normally handled by the existing traffic controller;
    determining a notification recipient; and
    sending a notification to the recipient indicative of the existing system alarm or fault in the operation of the traffic control cabinet or devices therein using a communications hub coupled to the cabinet adapter device, the communications hub comprising a wireless network interface and an application programming interface for enabling remote wireless communications to and from the communications hub and for interacting with the existing traffic controller, and the at least one of the monitor unit, the terminal and facilities, and the detectors in the cabinet.

13. A method for updating firmware in a traffic control cabinet in a traffic network, the traffic control cabinet utilizing legacy technology, the method comprising:
    determining a firmware update to be applied to one or more devices connected into the traffic control cabinet at an intersection associated with the traffic control cabinet; and
    sending the firmware update to a communications hub in the traffic control cabinet, the communications hub comprising a wireless network interface and an application programming interface for enabling remote wireless communications to and from the communications hub and for interacting with an existing traffic controller in the traffic control cabinet, and at least one of a monitor unit, a terminal and facilities, and detectors in the cabinet.

14. The method of claim 13, further comprising determining if it is possible to remotely update the firmware of the one or more devices connected into the traffic control cabinet.

15. The method of claim 14, wherein if it is not possible to remotely update the firmware of the one or more devices connected into the traffic control cabinet, the method further comprises automatically generating work instructions for performing an on-site upgrade.

16. The method of claim 13, wherein the firmware update is associated with third party software to enable communications with a third party serial or IP device in the traffic cabinet over an internet or cellular connection using the communications hub.

17. A method of selecting a series of pre-existing traffic signal timing plans to be applied across a traffic network, the method comprising:

analyzing network data to determine a state of the traffic network;

providing visualizations for an administrator of the traffic network to assess the traffic state;

providing the administrator with an enumerated list of available traffic signal timing plans for at least one traffic intersection; and upon selection of the at least one traffic signal timing plan, sending the at least one traffic signal timing plan to the at least one traffic intersection by communicating with a communications hub in a traffic cabinet at the intersection, the communications hub comprising a wireless network interface and an application programming interface for enabling remote wireless communications to and from the system and for interacting with an existing traffic controller in the traffic cabinet, and at least one of a monitor unit, a terminal and facilities, and detectors in the cabinet, the communications hub coupled to a cabinet adapter device comprising: i) at least one interface with a communication bus within the traffic cabinet for communicating with the existing traffic controller, and the at least one of the monitor unit, the terminal and facilities, and the detectors in the cabinet, and ii) a module configured to interpret legacy signals and protocols normally handled by the existing traffic controller, the cabinet adapter device configured for enabling execution of the at least one traffic signal timing plan.

18. A method for updating traffic signal timing plans in a traffic network, the method comprising:

monitoring data in the traffic network;

analyzing the data to determine a state of the traffic network;

determining at least one traffic signal timing plan or change to an existing traffic signal timing plan, for at least one traffic intersection in the traffic network, according to the state of the traffic network; and sending the at least one traffic signal timing plan or change to an existing traffic signal timing plan to the at least one traffic intersection by communicating with a communications hub in a traffic cabinet at the intersection, the communications hub comprising a wireless network interface and an application programming interface for enabling remote wireless communications to and from the system and for interacting with an existing traffic controller in the traffic cabinet, and at least one of a monitor unit, a terminal and facilities, and detectors in the cabinet, the communications hub coupled to a cabinet adapter device comprising: i) at least one interface with a communication bus within the traffic cabinet for communicating with the existing traffic controller, and the at least one of the monitor unit, the terminal and facilities, and the detectors in the cabinet, and ii) a module configured to interpret legacy signals and protocols normally handled by the existing traffic controller, the cabinet adapter device configured for enabling execution of the at least one traffic signal timing plan.

* * * * *